Feb. 28, 1961 D. KATZ 2,973,140

AUTOMATIC GRAPH COMPUTER

Filed Sept. 26, 1957 10 Sheets-Sheet 1

INVENTOR

David Katz.

AUTOMATIC GRAPH COMPUTER

Filed Sept. 26, 1957 10 Sheets-Sheet 2

INVENTOR

*David Katz.*

FIG. 6, FIG. 8
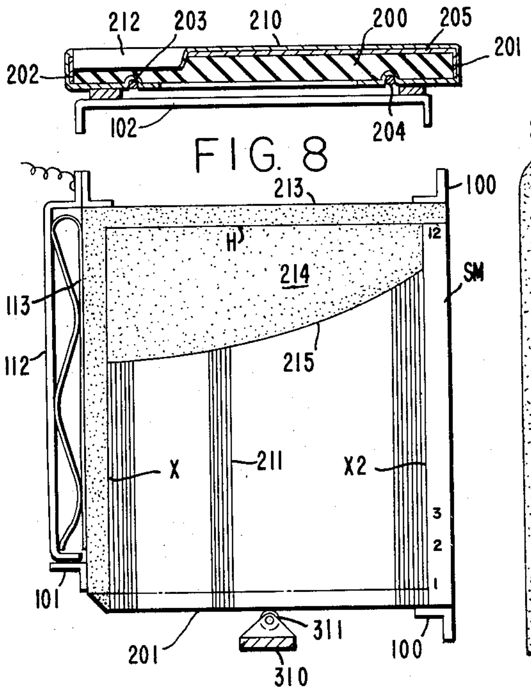
FIG. 7
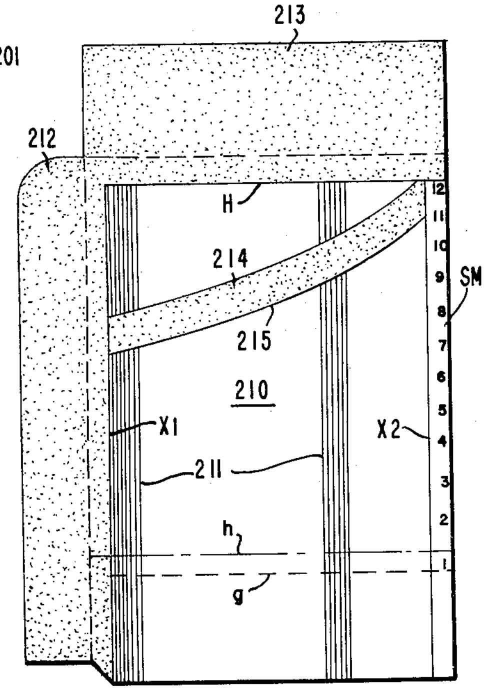
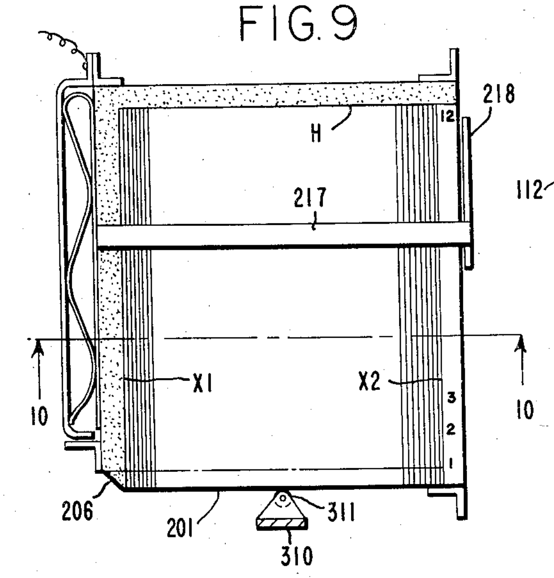
FIG. 10
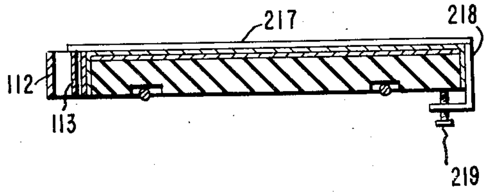
INVENTOR
David Katz.

Feb. 28, 1961 D. KATZ 2,973,140

AUTOMATIC GRAPH COMPUTER

Filed Sept. 26, 1957 10 Sheets-Sheet 4

INVENTOR

David Katz.

AUTOMATIC GRAPH COMPUTER

Filed Sept. 26, 1957 10 Sheets-Sheet 5

INVENTOR

David Katz.

FIG. 18
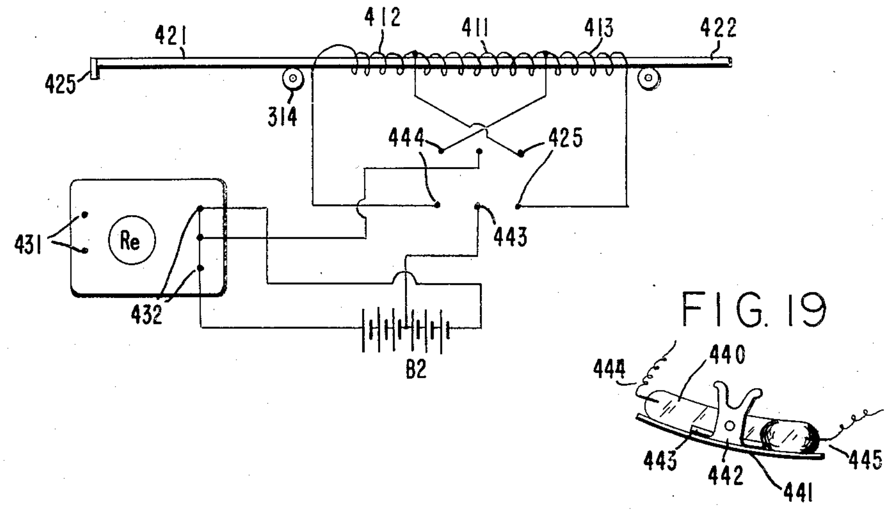
FIG. 18, FIG. 19
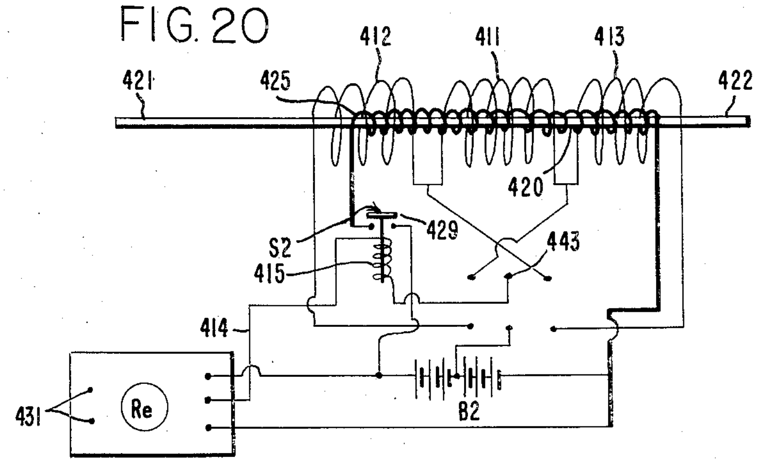
FIG. 20
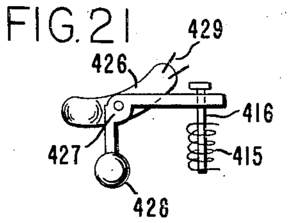
FIG. 21
INVENTOR
David Katz

INVENTOR

David Katz

INVENTOR

David Katz

INVENTOR

David Katz

INVENTOR

David Katz 2,973,140

AUTOMATIC GRAPH COMPUTER

David Katz, 506 W. 35th St., Wilmington, Del.

Filed Sept. 26, 1957, Ser. No. 686,430
11 Claims. (Cl. 235—61.6)

This invention relates to a novel device for performing automatically the basic arithmetical operations, e.g. addition, subtraction, multiplication and division, upon graphs.

As is well known, mathematical functions such as $y=f(x)$, may be expressed in three ways: By an algebraic formula; by means of tables setting up the values of the dependent variable $y$ opposite the independent variable or "argument" $x$; and in graphs wherein $y$ is plotted against $x$. The most common representation of graphs is in rectangular coordinates, wherein the $y$-values are plotted as "ordinates" against the $x$-values, which are called "abscissas."

If it is desired to add two graphs, one has a choice of either (1) converting each graph function into its algebraic form, add the two expressions by the rules of algebra and plot the third algebraic expression thus obtained, or (2) measuring off the ordinates of both curves at selected values of $x$, adding the two numerical values thus obtained for each selected value of $x$, and plotting the sum thus obtained in a third graph against the same value of $x$. The latter method is equivalent to tabulating each function and adding the values of $y$ tabulated against each selected value of $x$. Direct drawing of the sum curve from the two given curves is to my knowledge, except perhaps in very special and simple instances, unknown.

The same is true of the problem of finding the difference between two curves, their product or their quotient.

It is an object of this invention to provide an electrically operated device, hereinafter called the graph computer, which will automatically obtain the resultant curve from two, and in some cases three, given curves, without putting the investigator to the trouble of first formulating the given functions into algebraic expressions or of tabulating the ordinates of the curves against their abscissas. By "resultant" curve here and throughout this specification and claims I mean the curve resulting from the operation, regardless whether the latter be addition, subtraction, multiplication, division or mixtures of these operations. The word "resultant" therefore is meant to cover and include in its scope the words sum, difference, product, quotient and combinations of these.

Another object of this invention is to provide a device of the character mentioned which will actually draw the resultant curve on a sheet, so as to present the resultant function in the form of a graph which can be visually appraised and can be used for various purposes, including further arithmetical operations in the same device of this invention. But in a broader sense, drawing of the resultant graph is an optional refinement, inasmuch as the electrical value of the resultant as determined by the graph computer of this invention may be fed directly into a servo-mechanism, a computing machine or any other desirable device, without troubling the machine to form a visible graph of the resultant function. Other objects and achievements of this invention will appear as the description proceeds.

Referring now to the accompanying drawings:

Figure 6 is a side view, partly in section of a plate and sheet assembly employed as a basic unit in this invention.

Figure 7 is a top view of the spread out sheet which envelops the plate of Figure 6.

Figure 8 is a top view of the sheet and plate when placed in the machine, the adjacent members of the latter being shown in horizontal section.

Figure 9 is a top view like Figure 8 but employing a sheet of a different type employed in the same invention.

Figure 10 is a section through Figure 9 along line 10—10.

Figure 12:
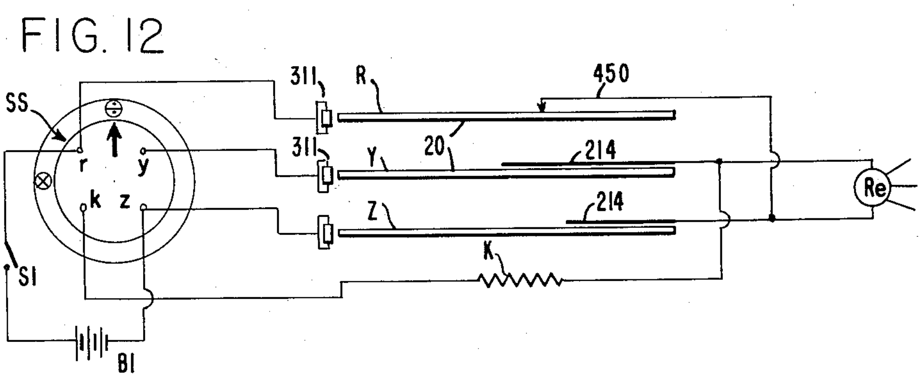
Figure 12 is a similar diagram but including a special selector switch and representing an advance over the simple device of Figure 11.
Figure 14B:
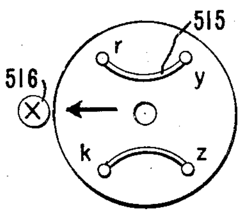
Figure 14A:
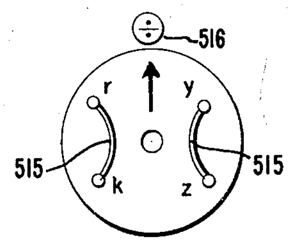

Figures 14*a* and 14*b* are diagrammatic representations of the two optional positions of the switch in Figure 12.

Figure 15B:
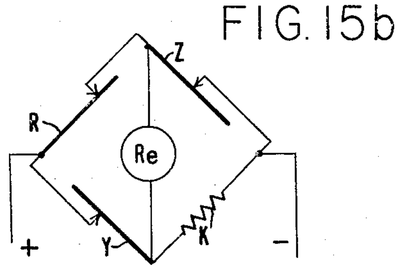
Figure 15A:
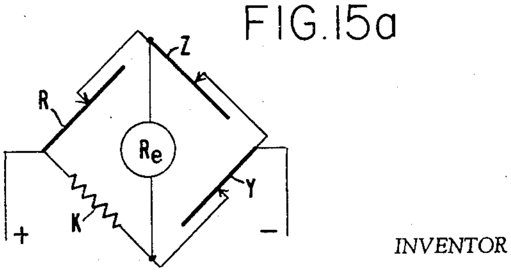

Figures 15*a* and 15*b* are the electrical diagrams for the device corresponding to the two selector switch positions shown in Figures 14*a* and 14*b*, respectively.

Figure 4:
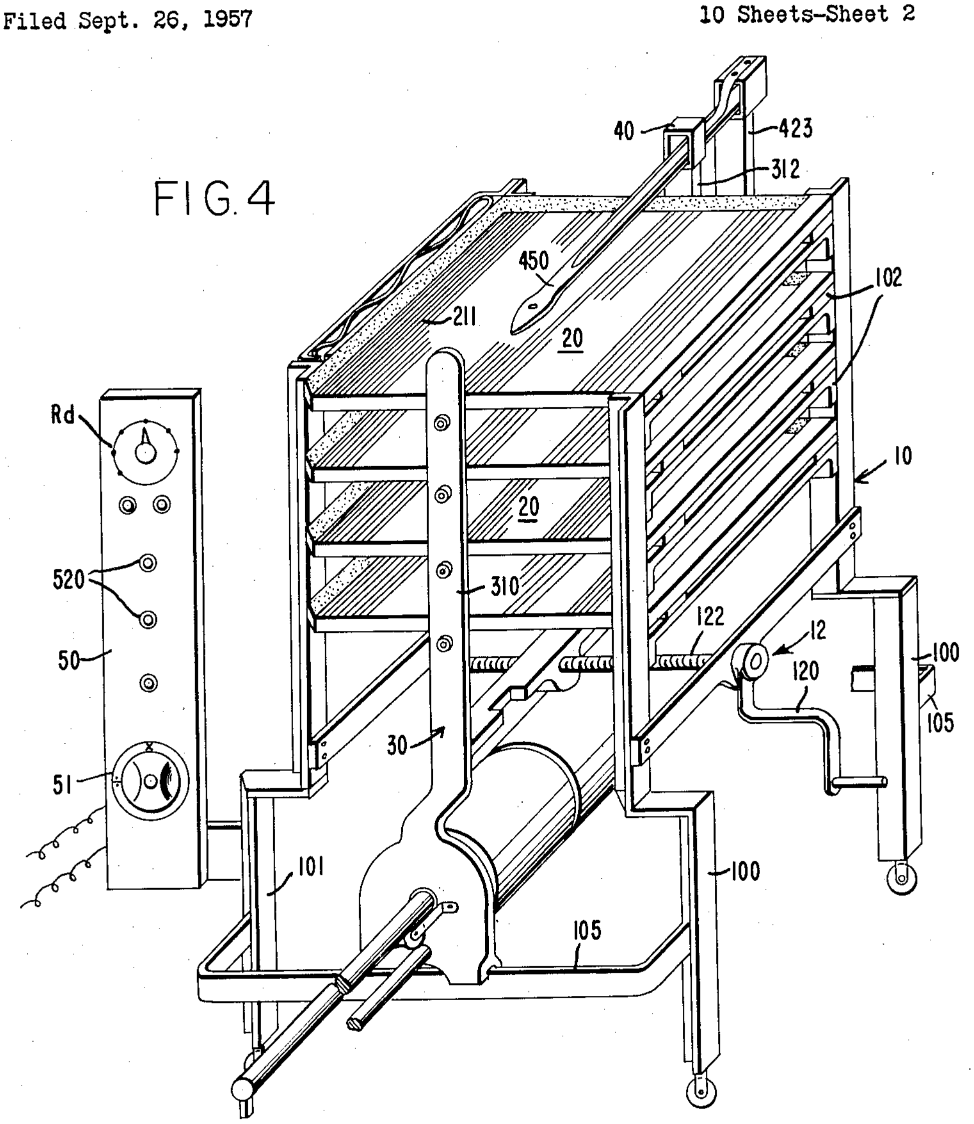
Figure 4 is a perspective view of an elementary graph computer constructed in accordance with this invention, and which can only multiply and divide.
Figure 16:
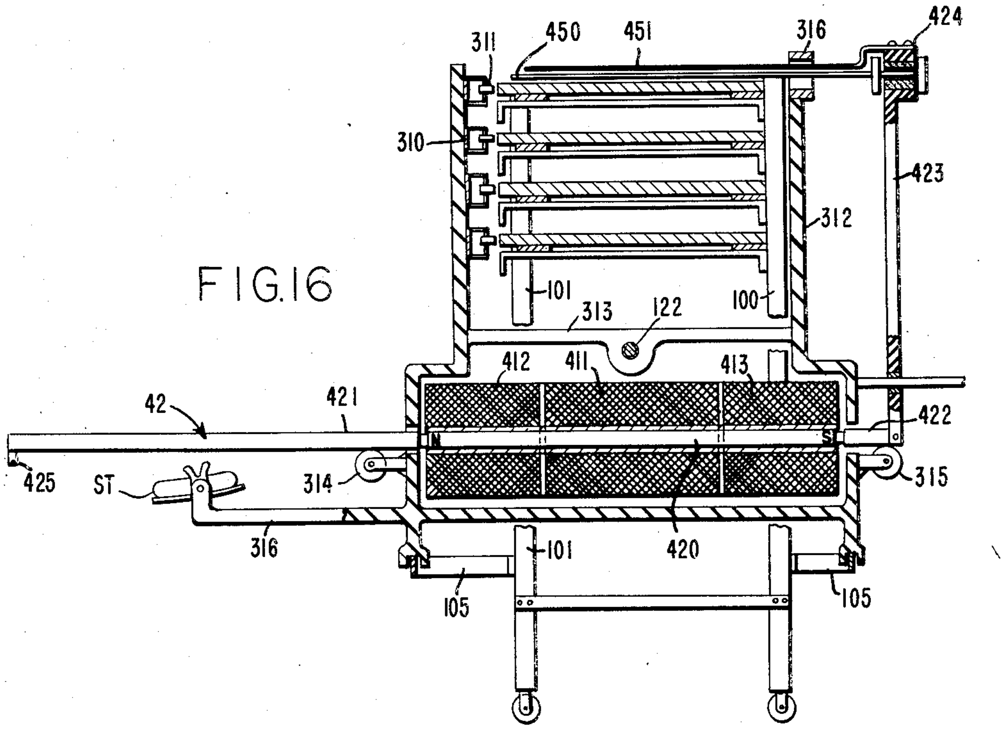

Figure 16 is a vertical view, partly in section, of an ambient, ordinate marking assembly employed in Figure 4.

Figure 17:
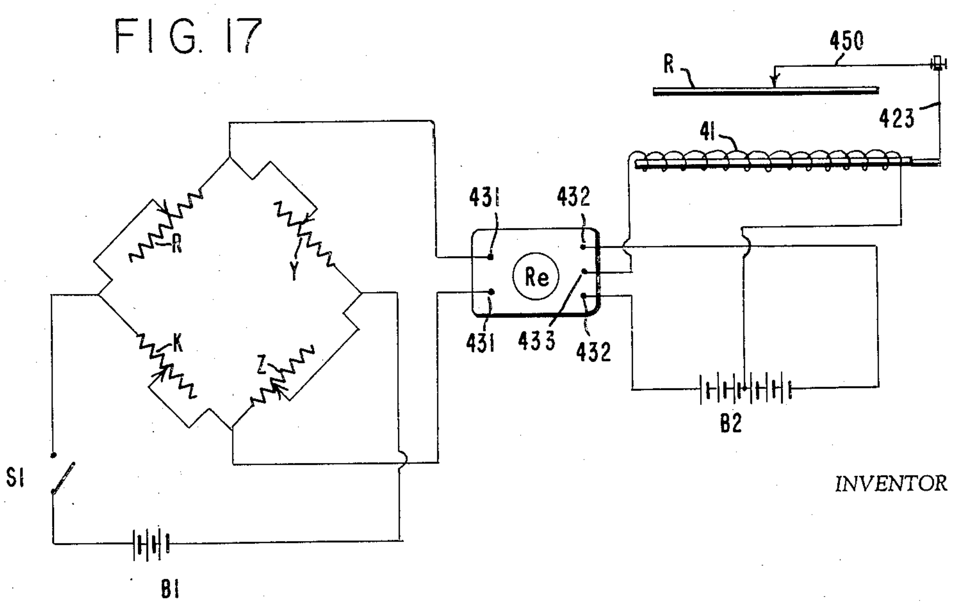

Figures 17, 18 and 20 are electrical diagrams of three optional circuits, of varying degree of complexity, to be employed for the ambient assembly of Figure 16.

Figures 19 and 21 are details of mercury switch elements used in the circuits of Figure 18 and Figure 20.

Figure 22:
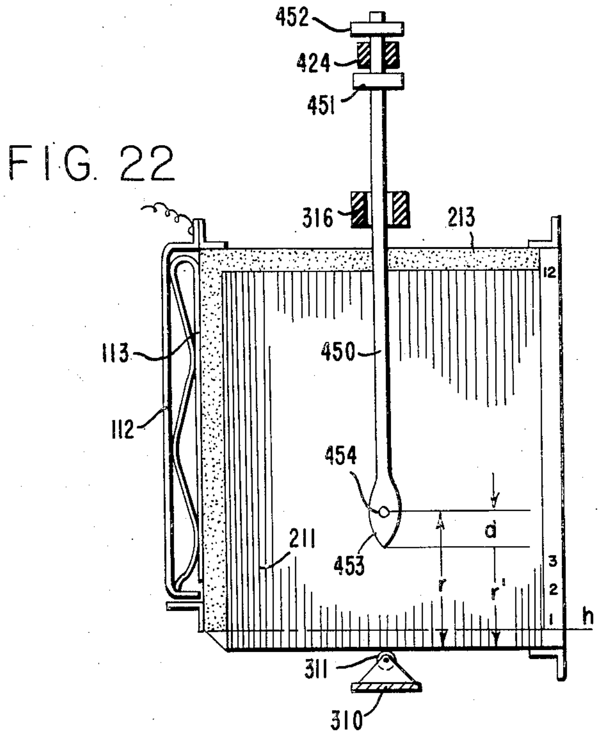

Figure 22 is a top view of the top plate in the machine, showing details of the ordinate marking device.

Figure 22A:
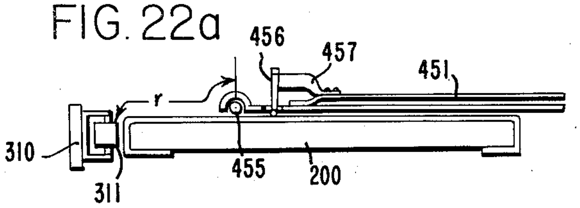

Figure 22*a* is a detail in vertical section of a modified form of the top plate unit and the mode of its contact with front contactor 311.

Figure 23:
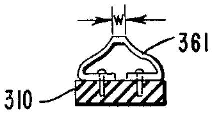

Figure 23 is a top view of an optional form of the front contactor.

Figure 24:
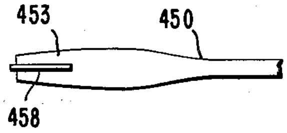

Figure 24 is a top view of an optional form of the ordinate marker.

Figure 25:
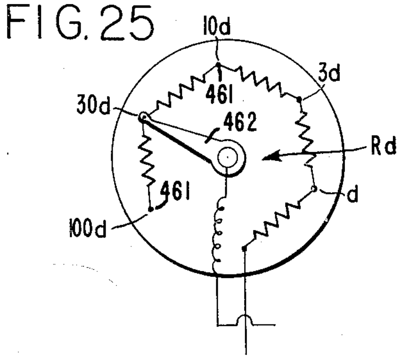

Figure 25 is a diagram of an auxiliary selector switch R*d* employed with certain forms of the ordinate marker.

Figure 26:
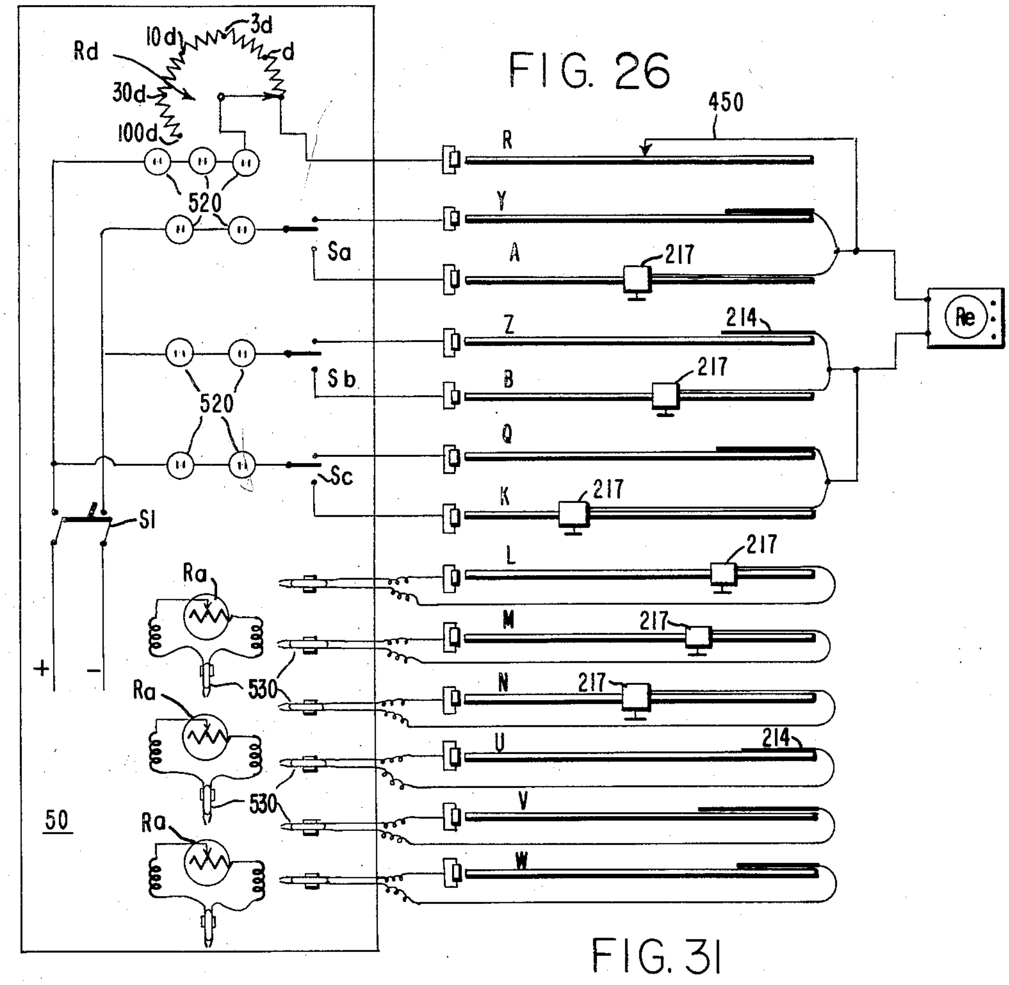

Figure 26 is a diagrammatic form of a general utility graph computer according to this invention. This machine can add, subtract, multiply, divide, and perform various other operations. The machine of Figure 26 has essentially the same mechanical structure as shown in perspective in Figure 4, but the number of plates is larger, and the electrical hook-up is modified.

Figure 27:
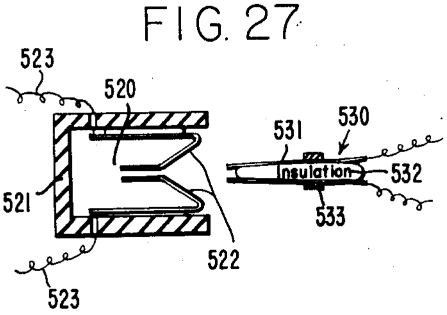

Figure 27 is a detail in vertical section of a plug-in unit which is useful in the electrical hook-up of Figure 26.

Figures 28 to 37 inclusive are graphs employed to illustrate the procedure for using the device of Figure 26 in solving various practical problems.

Figure 38:
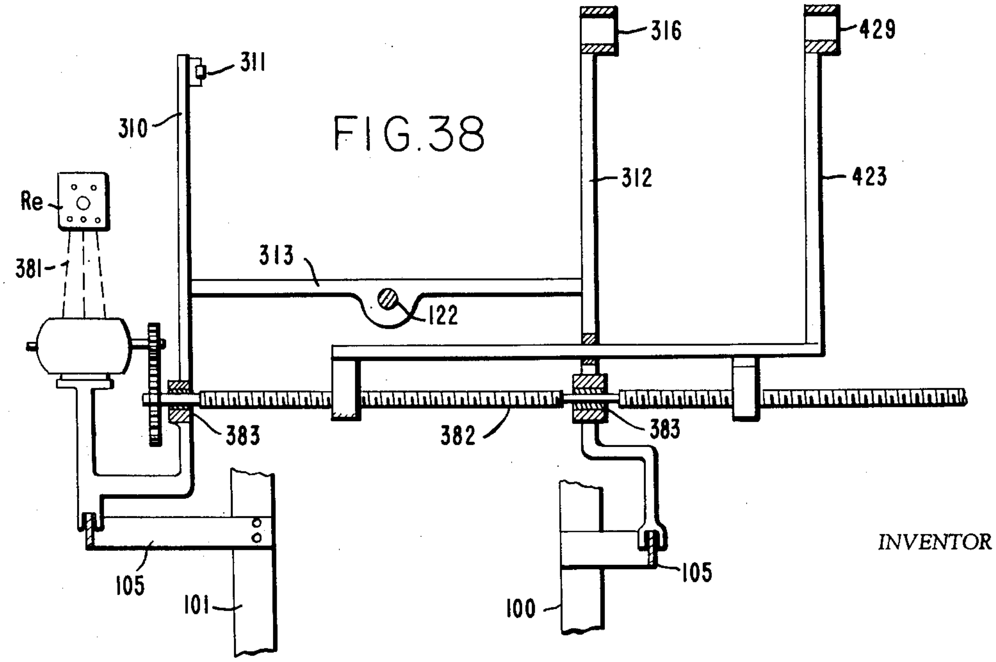

Figure 38 is an elevational view of an optional mode of achieving movement along the $y$-axis of the ordinate-marking member.

Figure 39:
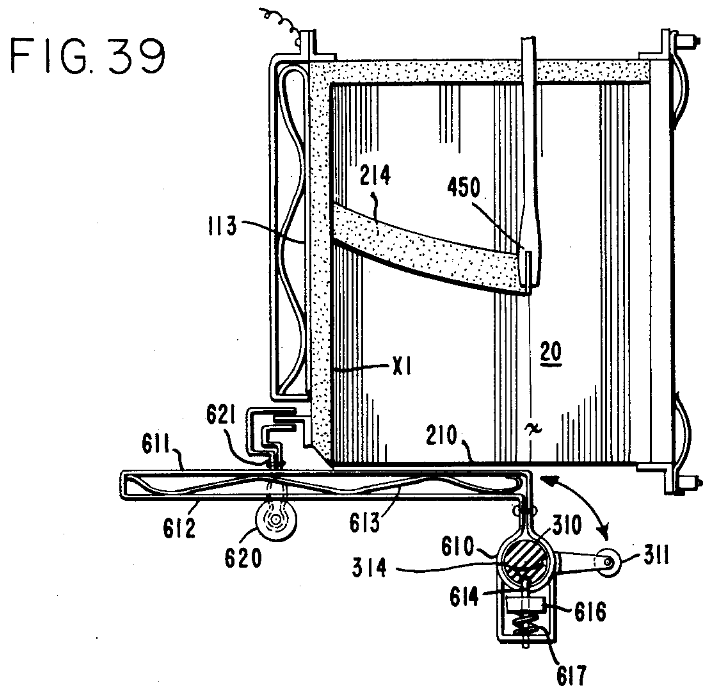

Figure 39 is a top view of a modified form of the front-end contactor, whereby the device of Figure 26 can be adapted for the operations of integration and differentation of functions.

BASIC THEORY

Figure 1:
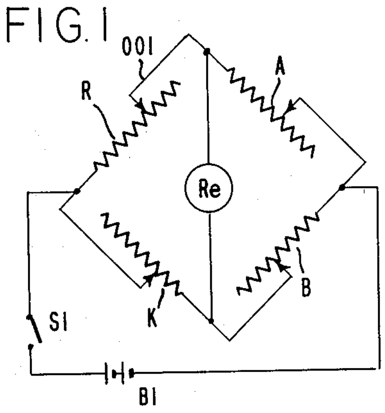
Figures 1, 2 and 3 are diagrammatic representations of modified Wheatstone bridge circuits, illustrating the basic principles of this invention.

The basic theory on which this invention is founded is best explained by Figure 1, which represents essentially the ordinary Wheatstone bridge. Resistances R, A, B and K constitute the legs of the bridge; S1 is a key, push button or switch. B1 is a dry cell or battery; it may be replaced by any steady source of voltage, preferably of D.C. type. Nevertheless, Wheatstone bridges applicable to A.C. are known, and may likewise be adapted for this invention. To simplify the explanation, however, as well as the design, we shall restrict the following discussion to cases where the supply of energy is or has been converted into a steady, D.C. type.

R*e* is a galvanometer in the conventional Wheatstone bridge. In my invention, however, the galvanometer is replaced by a servo-mechanism, that is, a current-controlled device for regulating the motion of an element to be described below. Such current-controlled devices generally include in their circuit a polarized relay. In similarity to the classical Wheatstone bridge, any bridge employed in the instant invention will be spoken of as balanced when there is no current through the field terminals of relay R*e*.

In Figure 1, all four legs have been represented as adjustable resistances. Nevertheless, we shall assume at first that the values of A, B and C have been set prior to operation of the device, while the position of sliding element 001 on Resistance R is determined by the operation of the control mechanism. If the current through R*e* is in one direction, element 001 will be moved forward; if the current is in the opposite direction, 001 will move backward; if the current is zero, the element will stand still.

Now, according to classical theory, when the current through R*e* is zero, the following relation exists between the values of the several resistances:

$$\frac{R}{K}=\frac{A}{B};\ \text{or}\ R=\frac{KA}{B} \qquad (1)$$

If we provide element 001 with a marking device to mark the position of its point of contact as soon as the element comes to rest, we have a device for marking off on the indefinitely extending resistance R that portion of it which balances Equation 1.

If we select initially $B=1$ (in the same units that we choose for expressing the other resistances, for instance ohms, milliohms, etc.), the bridge becomes a device for finding the product of two numbers:

$$R=KA \qquad (2)$$

If we select initially $K=1$, the bridge becomes a device for finding the quotient of two numbers:

$$R=\frac{A}{B} \qquad (3)$$

If we select intially both A and K equal 1, the device gives us the reciprocal of an arbitrary number B.

$$R=\frac{1}{B} \qquad (4)$$

If we select initially $K=1$ and $B=1$, the device becomes one for equating two values:

$$R=A \qquad (5)$$

(Although this is not ordinarily considered a basic arithmetical operation, the device of this invention is capable of achieving it.)

If none of the resistances are set at unity, the resultant R is a mixture of multiplication and division. It represents the product of two numbers divided by a third (Equation 1).

Figure 2:
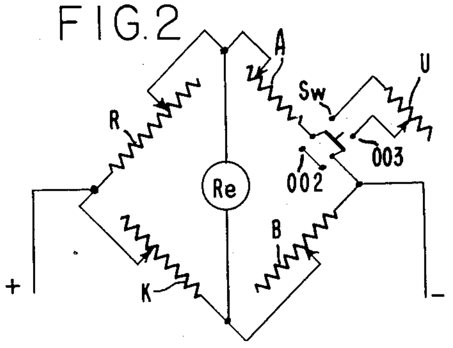

If we want to add two numbers, we may modify the basic structure of the bridge according to Figure 2. Here a double-pole-throw switch S*w* is inserted in series with A. If the switch is set upon terminals 002, which are "short-circuited" to each other, the system is identical with that in Figure 1. But if the switch is set upon terminals 003, adjustable resistance U is thrown into series with A. If we now set $K=1$ and $B=1$, and resistances A and U respectively upon the two values to be added, operation of control mechanism R*e* will give us the sum of the two on resistance R.

$$R=A+U \qquad (6)$$

Figure 3:
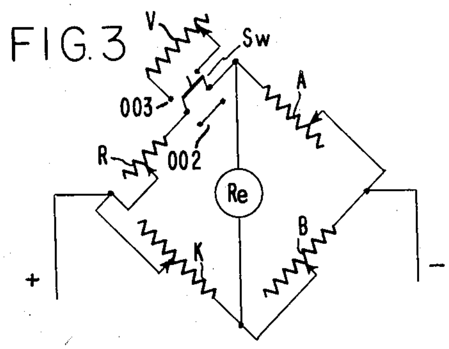

If we wish to subtract one quantity from the other, we may resort to a bridge as in Figure 3. Here the switch S*w* and optional resistance V are placed in leg R. If the switch is thrown upon terminals 003, and if B and K are each set at unity, operation of R*e* will give us $R+V=A$; hence $$R=A-V \qquad (7)$$

Obviously, we can insert switches S*w* in all four legs of the Wheatstone bridge, whereupon the device will become flexible to give on R almost any combination of the basic arithmetical operations. Thus far, however, we have only a device for operating upon numbers. The principal object of this invention, on the other hand, calls for a device capable of operating upon continuous functions which are presented to us in the form of graphs. So we shall now turn to Figure 4 and following.

GENERAL STRUCTURE

Figure 4 shows in perspective a simple form of the automatic graph computer. It comprises a rack or skeleton support 10, replaceable stationary resistor plates 20, a movable abscissa-selector assembly 30, a movable ordinate-marking assembly 40, and a control panel 50. In general terms, a screw feeding mechanism 12, operated by a crank 120, moves assembly 30 at will of the operator over guide rails 105 (front and back), in a direction parallel to the $x$-axis of plates 20, while the contactor 450 determines by its position the length of the ordinates 211 included at the particular moment as resistance R in the electric circuit. The legs 100, 101 of skeleton support 10, and preferably also the shelves 102, are made of non-conducting material, for instance a hardened insulating resin. The same is true of vertical post 310 of assembly 30, as well as of the vertical supports 312 and 423 (Figure 16) which carry the ordinate-marker 450. Post 310 carries contact rollers 311 which contact, respectively, the front edge of each plate 20 (Figures 8 and 9). Further details on these items are given in the subsequent figures.

Figure 6 shows one of the resistor plates 20 when viewed from the left side of Figure 4.

The plate assembly consists of a solid rectangular support 200 made of non-conductive material, for instance wood or plastic. Its top surface is covered with a sheet of smooth felt 205. Stretched over the surface of the felt, is an imprinted plastic sheet 210, which extends around the front and rear vertical edges 201 and 202 of the supporting plate, and is secured on the underside of the plate in any convenient manner, for instance by a spring wire loop 204 (partly broken away) fitting into groove 203 which is cut into the plate.

Imprinted sheet 210 is shown in stretched out form in Figure 7. It is essentially rectangular, except for the portion 212 which extends therefrom on the left, to be bent over the left edge of the plate. (This flap is partly broken away in Figure 6.) The sheet itself is electrically non-conducting, but it has imprinted thereon closely spaced, uniformly thin, vertical lines 211, in a conducting ink, for instance, aluminum paint, silver or silver oxide ink or a conducting carbon ink. Further details on imprinted resistors of this type are given in my copending application for patent, Serial No. 553,334, filed December 15, 1955. But at this point it is worthy of note that the imprinted lines are of uniform resistivity lengthwise on each plate, but different plates may have different resistivities (i.e. different resistances per unit length).

In fact, it is contemplated to have the plates manufactured in several standard grades, in which the vertical resistivity of the lines contacted simultaneously by the roller 311 (Figures 8 and 9) will be known and will vary from one grade to another according to a standard scale, say 1:3:10:30:100. By modern printed-circuit methods, a 100-fold variation in resistivity is not difficult to achieve. (See Modern Plastics, August 1951, pages 99–111.)

The portion to the left of vertical line X1 and the upper region 213 of the plate, above marked horizontal line H, are imprinted in a continuous area with conducting material, which may be of the same composition as lines 211 or may be of much higher conductivity. For instance, where the vertical lines 211 are of conducting carbon, the imprinted solid areas 212, 213 may be of aluminum, copper or silver.

Sheet 210 may also have other lines and markings imprinted thereon in non-conducting ink, for instance, two vertical lines X1 and X2 marking the limits of the $x$-range over which roller 311 is adapted to move; an upper limit H and a lower limit $h$ for the usable length of the conductive ordinates; a line $g$ which is to be used in orienting the sheet with respect to the line of contact with roller 311; as well as numbered division lines, a vertical scale and a horizontal scale.

Sheet 210 is thus essentially a sheet of graph paper with rectangular coordinates, except that it is provided with means for carrying an electric current over designated vertical paths on its surface.

When the problem requires it, a graph 215 of a specified function is plotted on this sheet by the aid of the scales imprinted thereon. A heavy ribbon above the curve, as in Figure 7, or else the entire region between this graph and line H (Fig. 8) is then painted-in with conducting inks say by the aid of a fine brush. The sheet is then mounted on plate 200 as shown in Figure 6. The portion 212 is turned down against the side edge of the plate and the unit is shoved into one of the nests of rack 10, over shelves 102 until it comes to rest against elastic metallic ribbon 113 inside brace 112 (Figure 8). The latter is connected by suitable lead wires to control panel 50. Spring clips 103 (Figure 5) may be provided on the right-hand side of the rack to lock plate assembly 20 in position after it has been seated. But of course, cooperating pins and sockets or any other mechanical device for proper seating and holding of plate 20 may be employed.

Roller 311 (Figure 8) is also made of conductive material, and is connected by suitable wiring to the control panel 50 or to intermediate electrical units. Roller 311 is affixed through a proper bracket to the insulated vertical column 310 of the abscissa selector 30, and moves with it parallel to the $x$-axis. It will be clear from Figure 8 that if roller 311 is connected to a source of E.M.F., current will flow through the roller and the ordinates 211 contacted by it at the moment to the conducting area 214—213 and out through flap 212, and metallic ribbon 113 to the control panel. If the resistance of the several contacts are minimized (or made allowance for) the resistance of the entire path will be determined by the length of the ordinate of curve 215 which is in contact with roller 311. As the latter moves along the abscissa, the length of the contacted ordinate varies. The resistance thus thrown into circuit by the imprinted plate is therefore proportional to the value $y=f(x)$ from which curve 215 has been plotted.

If the lines 211 are very fine and the felt padding 205 relatively soft, roller 311 may contact more than one ordinate simultaneously. In such a case the resistance of the imprinted path is equal to the quotient of the resistance of the middle ordinate by the number of ordinates contacted simultaneously, inasmuch as their lengths will be essentially equal. Except for this correction, which must be taken into account, the operation of the device is the same as in the previous case.

Resistor plates of the type just described will be hereinafter referred to as Y, Z-type plates or as variable curve resistors. But suppose we want in the system a constant resistance, i.e. one which does not vary as roller 311 travels along the abscissa. One solution to this problem is to draw graph 215 as a straight horizontal line, and paint-in the area 214 above it with a conducting paint. Another ready solution is to throw out the plate resistor altogether and replace it by a fixed conventional resistor or by a conventional variable resistor which is set at a fixed value and is properly included in the circuit, whether supported on rack 10 or outside of it. A third useable solution is shown in Figures 9 and 10.

In these figures, the support, resistor sheet and their mutual disposition are essentially the same as in Figure 6, but instead of drawing on the sheet a horizontal straight line graph and painting-in the area 214 above it, we supply here a vertically displaceable metallic contactor 217 whose lower edge, at least, is a horizontal straight line. Contactor 217 extends sufficiently far to the left to make contact with metallic ribbon 213 or at least with the conductive area to the left of X1. On the right hand end, it has a T-square like guide piece 218 to assist in guiding it straight along the right-hand vertical edge of the supporting plate 200, and it may bend over said edge to form an extension underneath the plate, through which by the aid of a thumb screw 219 it can be secured to the plate. The advantage of this mode of producing a steady resistance is that its value can be varied easily by moving contactor 217 up and down along the plate. This type of resistor plate will be referred to hereinafter as the K-type or constant value resistor plate.

Finally, the topmost resistor plate is of the same nature as in Figure 8 except that no curve is drawn on it prior to its insertion in the machine. Therefore, the vertical lines extend all the way up to line H, as in Figure 9, but there is no T-square shaped horizontal contact member attached. Instead, contact member 450 moves up and down along the $y$-axis, makes contact with the ordinates 211 at its lowest tip 453, carries the current to conductive area 213, above the H-line, and through this area to flap 212, metallic contactor 113 and out to the panel. This plate will hereinafter be referred to as the R-type resistor plate.

THE ELECTRICAL HOOK UP

Figure 11:
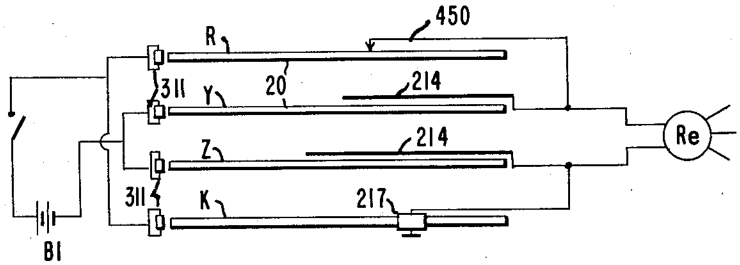
Figure 11 is an electrical diagram, showing the electrical hook-up of the simple machine of Figure 4.

The simplest form of electrical hook up for the resistor plates of Figure 4 is that shown in Figure 11. Here the plates 20 are represented symbolically by heavy horizontal straight line segments, while lighter straight lines are used to indicate the painted-in conductive areas 214, the ordinate defining member 450, and electric wiring in general. R$e$ represents the relay of a servomechanism 50 whose function is to move contactor 450 up or down the ordinates of resistor R in such a manner as to maintain a zero current through member R$e$. The direction of the battery B1 is merely symbolic and is not meant as a limitation on the disposition thereof. The same is true of the + and − signs occurring in some of the subsequent drawings.

It will be recognized that the hook-up is that of a Wheatstone bridge, and that Figure 11 corresponds in every element to Figure 1, except that members A and B of Figure 1 are replaced here by members Y and Z respectively.

Recalling that contact rollers 311 are all attached to the same vertical column of abscissa-selector 30, it will be clear that all 4 resistor plates are contacted at the same $x$-value at any given instant. As the assembly 30 moves over its guide rails 105, $x$ changes in value continuously from a minimum of X1 to to maximum of X2, the particular values of the limits X1 and X2 being assigned to them by the operator in accordance with the requirements of the problem to be solved.

If the graphs on plates Y and Z represent respectively $y=f(x)$ and $z=\phi(x)$, then for each particular position $x$, the resistance value of legs Y and Z of the bridge will be $y$ and $z$, respectively. The resistance value of K is constant, and if the mechanism R*e* operates to move element 450 until the bridge is balanced, the value of the resistance thus laid off on plate R is expressed by the equation:

$$r=\frac{Ky}{z} \tag{8}$$

If K is set at unity, the ratio becomes $$r=\frac{y}{z}$$

therefore, as $x$ is varied by the movement of assembly 30, the front end of contactor 450 plots by its "position of balance" a curve $r=\psi(x)$, which is the ratio of the two given curves $y$ and $z$. If a marking pen or crayon be associated with said front end of member 450, the resultant curve $r$ will be automatically recorded as crank 120 is turned by the operator.

If it is desired to multiply the two curves $y$ and $z$, it is merely necessary to interchange the positions of the two plates Z and K. Then Equation 8 becomes $$r=\frac{zy}{K} \tag{9}$$

which reduces to $r=zy$ if K is set at unity.

It will be noted in this connection that the rack 10 is designed so that any plate may be slid in and out of its nest at will and that the resistor plates are contemplated to be standardized, so that any plate will fit into any nest and make proper electrical contact there. Nevertheless, the work of shifting plates may be saved by providing a switch which will achieve the same result. For this purpose, the plates may be hooked up as in Figure 12.

Here the plates 20 are represented symbolically as in Figure 11, except that the K-plate is replaced by the conventional symbol for a fixed resistance, inasmuch as the use of a standard resistor for K is indeed highly suitable in this particular hook up. Also, in this layout, contact rollers 311 are connected to a selector switch SS instead of running directly to the battery.

Figure 13:
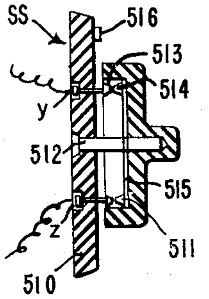
Figure 13 is a cross section through the selector switch employed in Figure 12.

As shown in Figure 13, selector switch SS comprises a stationary plate 510, over which floats a rotatable shell 511. By means of springs and stops (not shown), shell 511 is adapted to rotate in quarter circle jumps over pivot 512. Members 510 and 511 both have 4 contact points each, spaced in a square and marked $r$, $y$, $z$ and $k$ in Figures 12 and 14. Contact points 513 of plate 510 are connected through the underside of the plate to the resistor plates R, Y, Z and K and to a battery B1 as shown in Figure 12. The matching contact points 514, inside of shell 511 are connected in pairs by means of conducting strips 515, and serve merely to bridge across the corresponding pairs 513 in the stationary plate. Indicia 516 on the edge of plate 510 cooperate with an arrow-mark on shell 511 to indicate the position of the switch. When the arrow points toward the division mark, as in Figure 14*a*, points $y$ and $z$ are connected together, and so are points $r$ and $k$, whereas in the position shown in Figure 14*b*, point $r$ is connected to $y$, and point $k$ to $z$. In this fashion, when SS is in the position shown in Figure 14*a*, the disposition of the resistors in the bridge is as shown in Figure 15*a*, and the device is set for division according to the equation $$R=\frac{Kz}{y}$$

When SS is in the position shown in Figure 14*b*, the

Wheatstone bridge is that represented by Figure 15*b*, and the device is set for multiplication as in Equation 9.

THE ORDINATE-MARKING ASSEMBLY

Turning now to assembly 40 of Figure 4, the movement of contactor 450 along the $y$-axis of the R-plate may be achieved by any known servo-mechanism or automatic control device. The problem is to move contactor 450 upwards along the $y$-axis when the current through member R*e* is in one direction; downwards, if the current is in the opposite direction; and to bring contactor 450 to rest, when the current through R*e* drops to zero. Accordingly, the problem may be solved by any suitable servo-mechanism, for instance the relay servo described on page 56 of W. W. Soroka's "Analog Methods in Computation and Simulation" (McGraw-Hill, 1954). But for the sake of keeping the mechanism simple, inexpensive and spatially adapted for a compact machine as shown in Figure 4, the assembly 40, detailed in Figures 16 to 21 is recommended.

The abscissa selector assembly 30 comprises vertical columns 310 and 312 integrally connected through cross piece 313, and mounted for sliding on guide rails 105 of the skeleton 10. Columns 310 and 312 are preferably made of hard resins or other non-conducting material. Propulsion along the $x$-axis is effected by means of a hand operated or motor driven screw 122, passing through the threaded center of cross piece 313 and through bearings in the rack 10. Column 310 bears the contact rollers 311.

Below cross piece 313, and rigidly held by columns 310 and 312 is an electromagnet solenoid 41, through the core of which passes a permanent magnet 420 having non-magnetic extensions 421 and 422 so as to form a composite rod 42 of uniform thickness and about twice the length of the resistor plate R in the direction of the ordinates. The composite rod slides on rollers 314, 315 which are attached to columns 310 and 312 respectively. The letters N and S on magnet 420 are merely symbolic, and are not intended to limit the disposition of the poles.

It will be clear that when an energizing current is passed through solenoid 41, the permanent magnet assembly will be repelled or attracted and caused to move to the right of Figure 16 or to the left, depending on the direction of the current. Vertical column 423, affixed to extension 422 of the magnet rod, holds in its head 424 the ordinate contactor 450 and compels it to duplicate the movements of the magnet rod 42. Head 316 on rod 312 serves to steady the lateral position of contactor 450, while leaf spring 451 affixed on one end to head 424 and passing through head 316, insures proper contact between member 450 and the imprinted sheet of resistor R. The whole assembly of solenoid, magnet and contactor 450 moves with assembly 30 as the latter slides along the $x$-axis.

With a simplified system as just described, the electric circuit needed for operation of contactor 450 is as shown in Figure 17. Here R*e*, which is the same element as in Figures 1, 2, 3, 15 and 16, is a polarized relay having "field" terminals 431 and "local" terminals 432, 433. B1 is the battery of the Wheatstone bridge circuit, while B2 is the battery for the "local" circuit. The other elements are symbolic representations of the correspondingly numbered elements in Figure 16. Solenoid 41 is connected at one end to the central post 433 of the local terminals, and at the other end to the midpoint of battery B2. The terminals of battery B2 are connected to the two outer posts 432 of the local terminals. In this fashion, the current in solenoid 41 will reverse itself whenever the field current through terminals 431 changes directions. In lieu of the polarized relay, any other current amplifying device may be employed, provided it has facilities for causing the local current to reverse itself whenever the field current does so.

While the design of electromagnets is an art well known per se, certain refinements are recommended hereinbelow to insure against dead centers or weak spots in the movement of the magnetic rod. According to these refinements, solenoid 41 is made up of three distinct sections (Figure 18): a central section 411, whose length is just about equal to half the length of the contemplated movement of member 450 over the imprinted oridinates, and outer sections 412 and 413 whose length each is a little over one half of that of the middle section. The total solenoid length is thus slightly greater than said contemplated length of movement of member 450. The permanent magnet 420 proper is of a length just about equal to said contemplated displacement, but the total length of composite rod 42 is more than twice said contemplated displacement.

A trip switch ST, supported on extension 316 of the movable frame formed by members 310, 312, 313, is interposed along the path of magnetic rod extension 421, to be tripped by finger 425 when the magnet NS passes through the midpoint of its total movement. The function of this switch is to energize coils 412 and 411 (only) during the first half of the travel of magnet 420 to the right, and coils 412 and 413 (only) during the second half of the travel. The entire matter is made clear in Figure 18, which corresponds otherwise to the local circuit of Figure 17. Contact points 443, 444 and 445 in Figure 18 correspond to the terminals of the trip switch, which may consist of a pair of mercury switches 440 (Figure 19) mounted side by side in a cradle 441, adapted for rocking on pivot 442.

The effect of the above special design is that the thrust on composite rod 42 is more uniform and is always in the same direction as long as the field current through R*e* maintains a single direction.

Permanent magnet 420 may also be replaced by an electromagnet comprising a soft iron core and a solenoid wound around it sufficiently tight to slide freely through the bore of solenoid 41. (A lubricated, thin brass inner lining may also be provided in the bore.) In such a case, the "local" circuit will have provision for sending a steady current through the electro-magnet winding, which will not change direction when the field current in R*e* is reversed. This may be achieved as shown in Figure 20.

Magnetic core 420 has a tight "primary" winding around it which may be connected directly across the terminals of battery B2. However, to save the battery from wearing out when not in use, a key S2 is inserted in the circuit 425—B2, to be closed by an electromagnet 415 whose coil is inserted in the wiring segment 414 running from relay R*e* to terminal 443 of the circuit which includes the "secondary" winding 411.

The details of this key are shown in Figure 21. When solenoid 415 is energized, it pulls down core 416, tilting lever 427 against the action of weight 428, and causing mercury switch 426 to close upon the contact points 429. In this fashion, the circuit on primary winding 425 is closed only as long as there is current flowing through the secondary winding 411, which happens only as long as there is current flowing, in one direction or another, through field terminals 431 of relay R*e*. The direction of the current through 425 is however always the same, regardless of the changes in direction of the currents through R*e* and through the secondary winding.

Damping devices to prevent oscillations at equilibrium, and other details or modifications of assembly 40 will be readily apparent to those skilled in the art.

THE ORDINATE MARKING CONTACTOR

The details of the ordinate contactor, marked 450 in Figure 4, are shown in Figure 22. Contactor 450 passes loosely through the yokes 316 and 424 of non-conducting posts 312 and 423, respectively (see Figure 16) and moves together with the latter along the ordinates of plate R, by virtue of confining nuts 451 and 452. The tail end of contactor 450 or else conductors 112, 113 of the uppermost nest are connected by suitable lead-wires to the relay member R*e* (Figures 11 and 12). Its front end 453 is preferably pointed, and the point must be adjusted to lie along the same ordinate as makes contact with roller 311.

Incidentally, the conductive ordinates 211 on all the plates are preferably drawn at right angles to the edge of the plate, as is conventional in rectangular coordinates. But this is not an absolute necessity. The ordinates may be inclined at an angle to the *x*-axis (the front edge of each plate), provided the member 30 is designed so as to move contactor 450 at the same angle with respect to the *x*-axis.

It will be clear from Figure 22, that the rseistance *r* thrown into the Wheatstone bridge circuit by contactor 450 is the resistance of the segment of the imprinted ordinate comprised between roller 311 and point 453. If roller 311 is of less width vertically than the plane 200, the length of said segment *r* is to be measured from the upper edge of roller 311, as shown in Figure 22*a*. If in lieu of a flat sliding contactor one employs a ball-point contact, as also shown in Figure 22*a*, said length *r* is measured to the midpoint of ball 455.

To make a record of the movement of point 453 or ball 455, an opening 454 is provided slightly behind the point, through which a crayon, a ball-point pen, an inking brush, or any other convenient marking device may be inserted. The ink employed may be non-conductive, or it may be an electrically conductive paint, so as to trace a border for the conductive area 214 (Figure 7) to be painted in later, if needed.

As a result of the location of opening 454, the curve forming the lower edge of the conductive border thus applied will be slightly above the actual curved path traced out by point 453. To avoid error from this angle, an external resistance R*d* equal to that of segment *d* (Figure 22) is thrown into series with plate R. The resistance of segment *d* will vary with the resistivity of the imprinted sheet. As will be discussed later, the sheets are contemplated to be manufactured in standard gages, whose resistance per standard vertical division will run in a standard series, such as G, 3G, 10G, 30G and 100G. Then the resistance of segment *d* will likewise run in a series such as *d*, 3*d*, 10*d*, 30*d*, 100*d*. Consequently, a switch R*d* is provided on the panel (Figures 25 and 26), having contact points 461 arranged in a circular path and a revolving hand 462 adapted to contact these points. The resistance inserted between successive points is such that when the hand 462 is moved from point to point, the total resistance thrown into circuit successively is *d*, 3*d*, 10*d*, 30*d* and 100*d*, respectively. Then for each gage of imprinted sheet employed, switch 46 is set upon the corresponding value of R*d*.

It will be noted that the operation of the graph computer of this invention does not depend on the value of the voltage of battery B1 (or equivalent source of E.M.F. employed) and does not generally require the maintenance of a steady voltage in such battery (or source). However, if this is particularly desirable on any occasion, the circuit may be loaded with, per se known, voltage control devices to insure a steady voltage. A particularly valuable device for this purpose is the special circuit arrangement for drawing current at a constant voltage from a potentiometer device, described and claimed in my copending application Serial No. 518,240, filed June 27, 1955, now Patent No. 2,831,158.

LIMITATIONS OF THE MODIFICATION SHOWN IN FIGURE 4

The device described so far and based upon Figure 4 has two serious limitations: Firstly, it will will not add or subtract; it will only multiply and divide. Secondly, since there can be no negative resistance, the simplified device shown is not suitable for handling curves which have portions below the $x$-axis as well as above it. Indeed, because it is not desirable to short-circuit one leg of the Wheatstone bridge or even to reduce it to a very small resistance value, there is a practical lower limit $h$, below which it is not desirable to have any of curves Y, A or R extend.

The device may still be highly useful in limited fields, for instance in a laboratory where the type of problem investigated always gives graphs which are entirely above the $x$-axis, or entirely below it, but which never come closer to the $x$-axis than said minimum $h$. (Entirely negative curves can be handled by operating on the corresponding positive curves and then affixing the appropriate sign in front of the resultant product or quotient.)

To provide a device of more general utility, we now turn to the modification shown in Figure 26.

THE GENERAL UTILITY GRAPH COMPUTER

The general utility modification shown symbolically in Figure 26 is of essentially the same structure as that shown in perspective in Figure 4 and symbolically in Figure 11, except for the following principal differences:

(1) The number of plates is increased from 4 to about 12 or 13, plates A, B, K, L, M and N being of the adjustable constant type (K-type); plates Y, Z, Q, U, V and W being of the variable graph type (Y, Z-type), while R, as before, is the resultant plate to be contacted by ordinate-marker 450.

(2) Resistances R*a* are provided for insertion in series with some of the plates for a purpose to be explained later. A circle around each resistance R*a* is symbolic of the fact that it is sealed. It is adjusted by the manufacturer, and is not to be varied by the user.

(3) Selector switch SS is omitted, and panel 50 is modified to permit certain of the plates, for instance, L, M, N, U, V and W, as well as any of resistances R*a* to be inserted individually in series with any of the remaining plates, by the aid of plug-in sockets 520. Plate R is provided with three plug-in sockets, so that it may receive one or two of said other plates as well as one of the resistances R*a*, if need be, in series with itself. Also, the pairs Y and A, Z and B, and Q and K are provided with alternating switches S*a*, S*b* and S*c*, whereby each plate of any pair can be readily replaced by its counterpart.

The plug-in provision is shown in detail in Figure 27, although it will be obvious that any known device or structure for achieving the same purpose may be substituted for the one shown. In the latter, an insulated socket 521 holds two elastic contact members 522, which are attached to lead wires 523. When not disturbed, elastic members 522 are in contact, thus putting the two ends 523 in series with each other.

In plugs 530, collar 533 holds metallic terminals 531 of the apparatus to be plugged-in against a tapering insulation piece 532. When this plug is entered into socket 520, it separates the contact members 522, and through them cuts in the new plate or resistor between the wiring ends 523. It will be understood that the cords attached to the various plugs 530 on panel 50 are of sufficient length to reach any of the sockets 520 on the same panel.

THE STANDARD GRAPH SHEET AND THE SEALED ADJUSTING RESISTANCE R*a*

I have already indicated that it is contemplated to standardize the graph sheets needed for this invention, to facilitate their use and interchange. Referring back to Figures 7, 8 and 9, the useable range along the $x$-axis will be of the same width on all plates, namely from X1 to X2. Different $x$-scales may be provided on different plates, or several alternative $x$-scales may be imprinted in non-conductive ink on the same plate. Such non-conductive imprints should best be applied to the plate underneath the imprinted conductive ordinates or, if the sheet is transparent, on the underside thereof.

For instance, we may have two scales imprinted, dividing the range from X1 to X2 respectively, according to the decimal system, from 0 to 1 and from 0 to 3; or from 0 to 10, and from 0 to 30; etc. We may also have scales in which the successive major divisions are marked $$\frac{\pi}{4}, \frac{\pi}{2}, \frac{3\pi}{4}, \pi, \text{etc.}$$

Along the ordinates however, there should be only one imprinted scale, which should correspond to the vertical resistivity of the plate.

For instance assuming that the operative height H of each plate is fixed at 18 inches, the ordinates of each plate may be divided into about 12 major divisions (called units) and each of the latter may be subdivided into 10 division (tenths), and the latter again into 2 or 5 divisions each. Let us assume that the ordinates are so spaced that roller 311 contacts but one imprinted ordinate at a time, and let us define "vertical resistivity" of the plate as meaning the resistance of each ordinate in a length of one of said major divisions (1 unit). The maximum resistance of each contacted ordinate will then be about 12 times the vertical resistivity of the plate. We may then select a basic value G for vertical resistivity, and prepare five or more standard gages of the graph sheet as follows:

| Gage | Vertical resistivity | Imprinted scale | Pace | To go with R*d* value |
|---|---|---|---|---|
| G | G | 1 to 12 | 1 | *d* |
| 3G | 3G | 3 to 36 | 3 | 3*d* |
| 10G | 10G | 10 to 120 | 10 | 10*d* |
| 30G | 30G | 30 to 360 | 30 | 30*d* |
| 100G | 100G | 100 to 1200 | 100 | 100*d* |

The increment in scale-reading for each major division we shall call "the pace of the scale"; thus in gage 3G, the pace of the scale is 3; etc. The basic coefficient G is selected so that when the point 453 of contactor 450 comes to within a minimal height $h$ from the point where the sheet makes contact with roller 311, the resistance of the ordinate between the two contactors shall not drop below a desired safe value, from the viewpoint of heat development and dissipation.

For instance, suppose we select $G=50$ ohms. Then 1.5 inches along the ordinate of gage G will have a resistance of 50 ohms. If the two contactors are allowed to come within ¾" of each other, the resistance between them will be 25 ohms. If we employ a battery of 6 volts, the heat developed in the segment will be about 1.44 watts, which is probably not too high from the viewpoint of heat dissipation. If it is too high, other values of G or of battery voltage may be selected.

It will be noted, however, that as the drawn graph (or the point 453 of contactor 450) approaches the lower edge of the plate, the resistance of the various contactors and lead wires may become significant. For this purpose, sealed resistances R*a* are provided (Figure 26). Assuming that the sum total of these extraneous resistances is less than 10 ohms, the manufacturer inserts in series with roller 311 a variable resistance R*a* of about 10 ohms maximum, and putting a sheet of gage G on the plate R, manipulates both the resistor R*a* and contactor 450, until he finds a point along the ordinate where the resistance is just equal to G (say, 50 ohms). A horizontal line is drawn on the plate at this point and marked as major division 1. All other division lines on the graph sheet are then oriented with respect to this line, producing a vertical scale from 1 to 12. The scale thus imprinted by the manufacturer will hereinafter be referred to as scale SM.

The line $g$ along which roller 311 makes contact is also marked (Figure 7). This sheet then serves as a master sheet for producing all graph sheets of gage G. For sheets of higher gage, resistance R$a$ may not be needed. On the other hand, if a sheet or two of lower gage is added to the group, say a sheet of gage 0.3G, a different resistance R$a$ will have to be provided, by the above method, for this gage.

Finally, on each master sheet a minimal line $h$ is laid off at a practical distance from the lower edge of the plate to represent the limit below which contactor 450 must not move in. The resistance value of the ordinate $h$ will vary with each grade, and will preferably be marked on the scale; customarily, $h$ will be laid off at such a height that together with the sum of the contact resistances (including external resistance R$a$), its resistance value will correspond to that of ½ major scale division; then $$h=\frac{H}{24}$$

But other simple fractions may be selected. This $h$-value has to be taken into account in some of the operations described below.

The manner of using the machine of Figure 26 will now be explained and illustrated. But at this point we must provide for three basic steps which should be taken or should be understood to have been taken in every operation, whether the context mentions them explicitely or not.

(A) *Conductivizing.*—Whenever a graph is drawn on a standard imprinted sheet and mounted on a plate to be used as one of plates Y, Z, Q, U, V and W of Figure 26, it shall be understood that the area 214 above the curve has been or will be conductivized prior to insertion of the plate in its nest. By "conductivized" I mean rendered electrically conductive, as for instance by painting or spraying a silver ink, or other conductive paint, over the area in question.

(B) Whenever plates Y, Z, Q, A, B or K are mentioned in an operation, it will be understood that prior to operation, switches S$a$, S$b$ and S$c$ will be so set as to include in the circuit the plates mentioned (and automatically exclude their counterparts).

(C) Whenever stretching a sheet of a specified gage on plate R is mentioned, or wherever the phrase "use an R-plate of gage . . . " is employed, it will be understood that switch R$d$ will be turned to the setting corresponding to the selected gage. (For instance if gage 3G is selected, switch R$d$ will be set upon 3$d$; etc. This operation, however, is not needed with the apparatus modification of Figures 24 and 39, explained below.)

Remembering these implicit steps, will save us the redundance of mentioning them explicitely in every operation which follows.

Also, wherever practical, a curve laid off on the Y-plate will be referred to as $y$; a curve laid off on the U-plate will be referred to as $u$; etc.

I. *Reproduction of a curve*

This is not always a mathematical operation. But it often has to be done, and the machine of Figure 26 is well adapted to do it.

EXAMPLE 1

Figure 28:
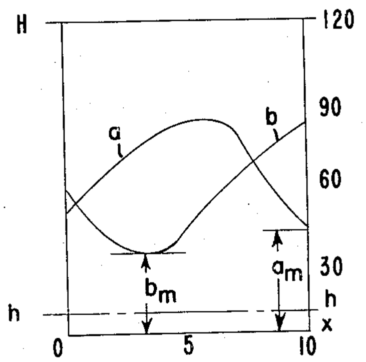

Given, say, curve $a$ of Figure 28, and required that we reproduce the same on plate R.

*Preliminary study.*—Observe that, in the range required, the curve varies from about 45 to about 80. Therefore, select a sheet of gage 10G; draw the given curve on this sheet, using the entire horizontal range from X1 to X2 or only part thereof, as desired. Having conductivized the area above the curve, stretch the sheet on a plate and insert the latter in nest Y of Figure 26, thus making it a Y-plate. Set plates B and K (by aid of knife-edge contactors 217) at an optional equal value, say $B=K=10$. Stretch a clean sheet of grade 10G over the R-plate, and having complied with conditions B and C above concerning the switches S$a$, S$b$, S$c$ and R$d$, operat the machine (i.e. close switch S1 and turn crank 120 of Figure 4), until roller 311 of plate Y has moved across the entire $x$-range of the curve thereon. The curve $r$ traced on the R-plate by the machine then constitutes the desired reproduction of curve $a$.

*Proof.*—When the bridge is balanced, $$\frac{r}{K}=\frac{y}{B}$$

but here $B=K$ and $y=a$; therefore, $r=a$.

EXAMPLE 2

If in the same problem we use on the R-plate a sheet of gage 3G or 30G, we will reproduce the given curve on an enlarged or reduced vertical scale, respectively. Also, in the same problem if we do not set plates B and K at the same value, but set instead plate K at $k$ times the value of B, we shall again obtain the resultant curve on an enlarged or reduced vertical scale (depending on the value of $k$), but in this case we shall have to inscribe on plate R a vertical scale S$r$ whose pace is $k$ times the imprinted scale SM.

EXAMPLE 3

To produce the mirror image of a curve. Given for instance, curve $a$ of Figure 28.

*Procedure.*—Draw curve $a$ on the U-plate and insert the latter in series with the R-plate. Switch over S$a$ to the A-plate and, set the knife-edge 217 of the latter at the very top, i.e. at value H on scale SM. Set B and K at an arbitrary equal value. Operate the machine to produce a curve on plate R. Mark the upper edge of the R-plate as the $x$-axis for scale S$r$, and inscribe the latter downwards on the same pace as SM. Then curve $r$, when read on scale S$r$ constitutes the reverse, negative, or mirror image of given curve $a$.

*Proof.*—When the bridge is balanced, and because we have plate U in series with R, $$\frac{u+r}{K}=\frac{H}{B}$$

But $K=B$ and $u=a$. Therefore, $r=H-a$.

II. *Addition of two curves*

Problem: To add 2 given curves.

EXAMPLE 4

Figure 31:
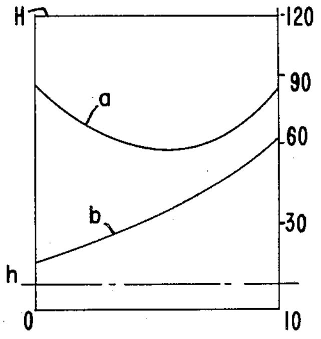

Say the given curves are $a$ and $b$ as in Figure 31. The $x$-range is 0 to 10; the ordinates of both curves are positive and within the range of the scale of a 10G sheet, neither curve having any values below the $h$-line on said sheet.

*Procedure.*—Draw one curve each on a 10G sheet, conductivize the area 214 above each curve, and mount the sheets properly on plates. Insert one plate in the Y-nest and the other in the U-nest of Figure 26. Plug-in the U-plate in series with the Y-plate, setting switch S$a$ on Y. Set switches S$b$ and S$c$ on B and K, respectively; setting each of the latter at the same optional value; say $B=K=50$. Insert on R a 10G sheet (or if necessary, a 30G sheet). Operate the machine to obtain a curve on plate R. The curve $r$ thus obtained, is the sum sought.

EXAMPLE 5

Figure 29:
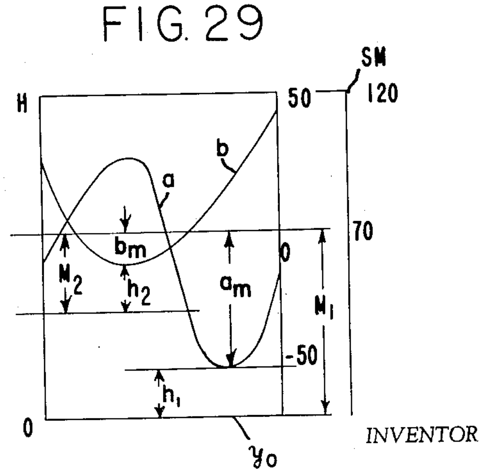

Say the two curves $a$ and $b$ are as shown in Figure 29; that is, one or both of the curves dip below the $x$-axis, or at least dip below the safety minimum $h$.

*Procedure.*—Selecting a proper grade of the conductive sheet (say 10G), draw on plate Y curve $y=a+M_1$, where $M_1$ is a constant so chosen that the lowest point of $y$ (in the given range of $x$) is above the $h$-line on the selected sheet. This can be achieved readily by drawing in the given Figure 29 a horizontal line $y_0$ at a distance $h_1$ below the minimum of $a$, where $h_1>h$. The needed $y$ curve is then the curve $a$ when read with respect to $y_0$ as $x$-axis. The value $M_1=a_m+h_1$ is readily determined from the sketch, as shown in Figure 29.

Do the same operation with curve $b$, obtaining $h_2>h$ and $M_2$. Lay off $u=b+M_2$ on plate U. Plug-in U in series with Y; set $B=K$, as before, and operate the machine to obtain a curve on plate R. Next, lay off on the R-plate an $x$-axis $r_0$ at $SM=(M_1+M_2)$, and lay off with respect to this axis a scale $Sr$ of same pace as SM. Then the curve $r$, when read with reference to scale $Sr$, constitutes the sum of the two given curves.

*Proof.*—Instead of adding $a+b$, we actually added $y+u$, where $y=a+M_1$, and $u=b+M_2$. Therefore, the curve traced is $r'=(a+b)M_1+M_2$; hence, $$(a+b)=r'-(M_1+M_2)$$

it follows that if $r=r'-(M_1+M_2)$, $r$ represents the desired sum $(a+b)$.

EXAMPLE 6

Suppose we started as in Example 3 or 4, but find that while $a$ and $b$ individually are neatly accommodated in a sheet of grade 10G, their sum exceeds this range. We may then proceed optionally in three different manners.

(6$a$) We may select for R a plate of grade 30G. (It is a remarkable advantage of this invention that plates of different gages, hence different scales, may be inserted in various legs of the Wheatstone bridge as well as in series with each other. In a mechanical device for adding or subtracting ordinates, such liberty would not exist.)

(6$b$) Referring to Figure 28, suppose the minima of the two given curves, $a_m$ and $b_m$, are each considerably larger than the needed safety clearance $h$. Then, plug-in plate L in series with $R$, setting its knife edge 217 at value $L=(a_m+b_m-h_1)$, selecting $h_1$ at an arbitrary value larger than $h$. Operate the machine as in Example 1, but at the end draw a horizontal line on plate R at the lowest value of $r$. Mark this line as representing the value $(a_m+b_m)$ on scale $Sr$, and complete the vertical scale $Sr$ (of same pace as SM). Then the curve $r$ on plate R when read on scale $Sr$ constitutes the desired sum of curves $a$ and $b$ of Figure 28.

*Proof.*—The bridge is balanced when $L+r=y+u$. In this case $y=a$ and $u=b$, while $L=a_m+b_m-h_1$. Therefore, $r=(a-a_m)+(b-b_m)+h_1$, which tells us that even at its lowest point $r$ will be above $h$. Now, the $x$-axis for $Sr$ properly belongs at height $SM=h_1-(a_m+b_m)$. But this point is below the useable lower edge of the sheet; so we reason that if $Sr=0$ when $SM=-(a_m+b_m)$, then $Sr=(a_m+b_m)$ when $SM=h_1$.

(6$c$) Starting with the system as in Example 4 or 5, run the machine until the resultant curve is approaching the upper limit H of plate R. Stop the machine (switch S1). Read the highest value $r_m$ thus inscribed on plate R. Lay off the value $(r_m-h)$ on one of the variable constant plates, say plate N, and plug-in the latter in series with R. Resume operation of the machine and continue to the end. The graph obtained on plate R will then look somewhat as in Figure 30, the scale $Sr$ for segment $r_2$ being laid off as a continuation of the scale $Sr$ for segment $r_1$.

III. *Subtraction*

In subtraction, the minuend is laid off on plate Y while the subtrahend is plugged-in in series with R. Plates B and K are used in lieu of Z and Q, setting $B=K$, as before. If there is danger that the result will drop below the safety limit $h$, or perhaps become negative altogether, insert in series with Y the variable constant plate M, setting it at such a value as to overcome said danger. The value of M is then taken into account in fixing the location of the $x$-axis for the $r$-curve.

EXAMPLE 7

Given the two curves $a$ and $b$ of Figure 31. Wanted $r=a-b$.

*Procedure.*—Selecting sheets of proper gage, put curve $a$ on the Y-plate, and curve $b$ on the U-plate. Plug-in U in series with R. Switch-in B and K, making $B=K$. Operate the machine, obtaining a curve $r$ on plate R, which represents the desired function $r=a-b$.

EXAMPLE 8

In the same problem, suppose we want $r=b-a$. We now plot $b$ on plate Y, and $a$ on plate U.

We can see that the result will be negative throughout.

*Procedure.*—Set plate M at value H (top of sheet), and plug it in in series with plate Y (the minuend). The subtrahend $a$ is inserted in series with R, as before. The rest of the operation is as in Example 7, but at balance we have $r+a=b+H$. Consequently, $$b-a=r-H$$

We therefore locate the $x$-axis on top of plate R (i.e., $SM=H$) and inscribe scale $Sr$ downward, which converts the curve on R into the sought result: $r=b-a$.

IV. *Simultaneous addition and subtraction*

EXAMPLE 9

Say, wanted $r=a+b-c$, where $a$ and $b$ are the two curves of Figure 29 while $c$ is one of the curves of Figure 28 or 31.

*Procedure.*—Lay off on the Y-plate $y=a+M_1$ (as in Example 5); lay off on the U-plate $y=b+M_2$ (as in Example 5); plug-in U in series with Y. Lay off $c$ on plate V, and plug-in same in series with R. Switch-in plates B and K, setting $B=K$, as before. Operate the machine to obtain a curve on plate R.

*Analysis.*—$r+v=y+u$; hence, $r+c=a+b+M_1+M_2$; $a+b-c=r-(M_1+M_2)$.

*Conclusion.*—Lay off an $x$-axis on R at point $SM=(M_1+M_2)$. Inscribe scale $Sr$ (of same space as SM); then the recorded curve, when read with respect to such scale, constitutes the desired result.

EXAMPLE 10

In the same problem, we could have taken the resultant plate from Example 5 which has on it the sum $a+b$. Inserting this plate in nest Y, we then insert curve $c$, plotted on plate V, in series with R. Using B and K as before, complete the operation as above.

*Analysis.*—The Y-plate now bears the sum $(a+b)$ when read with respect to the inscribed scale $Sr$. The machine, however, reads all curves with respect to the imprinted scale SM. Consequently, the resistance which we are putting into the circuit through the Y-plate is $y=a+b+M_1+M_2$. This resistance is balanced on the R-side by $r+v$, where $v=c$. Therefore, $$a+b-c=r-(M_1+M_2)$$

which is the same result as in Example 9.

It will be noted from all the above, that location of the $x$-axis for the curve obtained on plate R is often an essential postscript to the mechanical process. This, however, is no serious objection, in view of the simplicity of the mental operation required, and is no different in principle than the need for locating the decimal point on the answer received in a slide-rule operation.

It will be further noted that up to now we have selected the conductive sheets so that the pace of their scales coincided with the pace of the given curves. For instance, the given curves $a$ and $b$ were in the range between 10 and 100 and we selected sheets of gage 10G, whose imprinted vertical scales run from 10 to 120. But this is not an absolute necessity. We might have selected, for instance, sheets of Grade G, with the understanding that 1 major division on the sheet represents 10 units of ordinate on the given curves. In such cases we are still free to use in the system plates of different gages, but we must be careful to apply the same magnification factor to all plates used in the process.

V. *Multiplication*

EXAMPLE 11

Say we want to multiply one of the curves in Figure 28 by a constant $k$.

*Procedure.*—Lay off the assigned curve on plate Y. Still using plates B and K, set B at unity, and K at the assigned value $k$. Operate the machine to obtain a curve on plate R. Then $r=ky$.

*Alternative procedure.*—Proceed as above, except set plate B at a convenient value other than unity. Then set plate K at the value $k$B, using a plate of higher gage, if need be, to accommodate the value $k$B. The rest of the procedure is as above.

EXAMPLE 12

Wanted, the product of the two curves $a$ and $b$ shown in Figure 28.

*Procedure.*—Lay off curve $a$ on the Y-plate; lay off curve $b$ on the Q-plate. Set switch S$c$ on to the Q-plate, and switch S$a$ onto the Y-plate. Retaining switch S$b$ on the B-plate, set the latter at unity. Operate the machine and obtain $r=qy=ba$.

*Alternative procedure.*—Set the B-plate on an optional higher value, say $B=10$; then instead of laying off on the Q-plate curve $b$, lay off on it curve $c=10b$, using a higher gage sheet if need be. The rest of the procedure and the result are the same as above.

EXAMPLE 13

Wanted, the product of two curves $a$ and $b$ as in Figure 29 (i.e. both curves dip below the $x$-axis). In Example 5 we solved the problem of how to "rectify" these curves (i.e. transform them into curves which are entirely above the $x$-axis and, indeed, above a minimal value $h$). We now face the additional problem of insuring that the resultant curve $r$ will not dip below the $h$-line of plate R. Therefore, a three-step operational procedure is recommended in this case, preceded by a preliminary mental step and followed by the concluding mental step of orienting the $x$-axis on plate R.

*Preliminary step.*—First determine the constants $M_1$ and $M_2$ needed to rectify curves $a$ and $b$ (see Example 5).

Secondly, observe that in sections of the assigned $x$-range where $a$ and $b$ are both negative, the product will be positive. Negative values of the product can arise only in section where curves $a$ and $b$ are on opposite sides of the $x$-axis. Observing such sections at points where either $a$ or $b$ has a maximum (in absolute value), we can readily estimate the absolute value of the largest negative ordinate in the product (in the range of $x$ specified). Call this value $-P_1$. We may also estimate the largest positive value $+P_2$ of the product. The sum of $P_1+P_2$ gives us an idea as to the gage of imprinted sheet to be selected for the answer. Assuming for instance that in Figure 29, $P_2$ is about 100 and $P_1$ about 500, then $P_1+P_2$ is roughly 600. This suggests selecting for R a sheet of grade 100G, whose imprinted scale runs from 100 to 1200.

Thirdly, using the formula discussed hereinbelow, select an arbitrary number $j>2$, for use in the operations indicated below. With the values of $M_1$, $M_2$, $P_1$ and $P_2$ above assumed, $j=2.30$ will be just about right.

*Operation 1.*—Lay off $y=a+M_1$ on plate Y (as in Example 2). Lay off an arbitrary value on plate B (say, $B=10$). Lay off on plate K the value $j\text{B}M_2$. (If $B=10$ and $j=2.3$, the value of K will be 2.3 $M_2$). Setting switches S$a$, S$b$ and S$c$ as need be, switch-in plates Y, B and K. Operate the machine to produce a curve on R. Calling this $r_1$, it is easy to see that $$\frac{r_1}{jBM_2}=\frac{a+M_1}{B}$$

whence $$r_1=jM_2(a+M_1)$$

Remove the R-plate, conductivize its area 214 above the curve, insert the plate in nest U, and refer to it henceforth as the U-plate. Put a fresh plate in the R-nest.

*Operation 2.*—Lay off curve $q=B(b+M_2)$ on plate Q; leave plate B at its previous value; and lay off on plate A the value $j\text{M}_1$. Change switches S$a$ and S$c$ to throw out plates Y and K and to switch-in in their place plates A and Q. Operate the machine to obtain a curve on plate R. Designating the new curve as $r_2$, it is easy to see that $$\frac{r_2}{B(b+M_2)}=\frac{jM_1}{B}$$

from which, $$r_2=jM_1(b+M_2)$$

Transfer the R-plate into the V-nest (first sensitizing its area 214 above the curve), and refer to it hereafter as the V-plate. Put a fresh plate in the R-nest, its grade being as determined in the preliminary step (100G, in the assumed example).

*Operation 3.*—Lay off the value $(j-1)\text{M}_1$ on plate L and plug-in same in series with plate Y. In this example, $j-1=1.30$. Lay off value $B(j-1)\text{M}_2$ on plate M and plug-in same in series with plate Q. [In this example, $B(j-1)=13$.] Plug-in plates U and V in series with R. Leaving plate B at its original value, check or change switches S$a$, S$b$, S$c$ to insure that plates Y and Q are now in the Wheatstone bridge circuit. Operate the crank to lay off a curve on plate R. Designating this curve as $r$, and taking into account the plugged-in series resistances, the following relation may be formulated:

$$\frac{r+u+v}{B(b+M_2)+B(j-1)M_2}=\frac{(a+M_1)+(j-1)M_1}{B}$$

but $$u=r_1=jM_2(a+M_1),\text{ and } v=r_2=jM_1(b+M_2)$$

therfore, $$r+jM_2a+jM_1b+2jM_1M_2=(b+jM_2)(a+jM_1)$$

Expanding and cancelling out identical terms, $$r=ab+(j^2-2j)M_1M_2$$

from which $$ab=r-(j^2-2j)M_1M_2$$

*Final step.*—Lay off on the R-plate an $x$-axis at $SM=(j^2-2j)M_1M_2$. Inscribe scale S$r$ (of same pace as SM) on this $x$-axis. Then $r$, when referred to scale S$r$ represents the desired product $ab$.

*Selection of the constant j.*—The object of selecting $j$ is to insure that the final curve $r$ is entirely within the area of plate R, and also to enable us to locate the $x$-axis for the curve $r$.

Let us suppose that from the shapes of the two given curves we have reason to expect the final curve $r$ to be partly negative and partly positive with respect to axis N, which is laid off on the R-plate at the point $$Sm=(j^2-2j)M_1M_2$$

Figure 32:
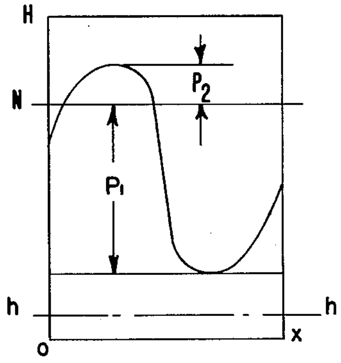

Let us further suppose that we can estimate the largest dip below the axis N to be $P_1$, and the largest rise above the axis to be $P_2$ (Figure 32). The entire height of the plate is H, but it is not desirable to have the curve dip below safety line $h$, which is, say $\frac{1}{12}$ H. Then we may set up the following basic conditions:

$$(a)\quad P_1<(N-h)\qquad (b)\quad P_2<(H-N).$$

Substituting for N its value $(j^2-2j)M_1M_2$, replacing $h$ by $\frac{1}{12}$ H, and properly transposing, we have $$(a)\quad (j^2-2j)M_1M_2>P+H/12$$
$$(b)\quad (j^2-2j)M_1M_2<H-P_2$$

The solutions to (*a*) and (*b*) are $$(a)\quad J>1+\sqrt{1+J_1}\qquad (b)\quad J<1+\sqrt{1+J_2}$$

wherein $$J_1=\frac{P_1+H/12}{M_1M_2},\ J_2=\frac{H-P_2}{M_1M_2}$$

Computing $J_1$ and $J_2$ we get a lower and an upper limit for *j*, from which a convenient value for *j* may be readily selected.

For example, in the problem of Example 13, we found or assumed $M_1=50$, $M_2=25$, $P_1=500$, $P_2=100$ and $H=1200$. Therefore, $J_1=0.48$, $J_2=0.88$; hence $j>2.22$ and $<2.37$. So, for convenience we chose $j=2.30$.

VI. *Division*

The problem here may assume several aspects, for instance:

Division of a curve by a constant,
Division of a constant by a curve,
Division of a curve by a curve, and where a curve is involved, it may be entirely positive and above the lower safety limit *h*, or it may have negative sections.

EXAMPLE 14

To divide curve *a* of Figure 28 by a constant C.

*Procedure.*—Lay off curve *a* on plate Y. Lay off on plate K an arbitrary value (say $K=10$), and set plate B on C times that value; $B=CK$. Setting properly switches S*a*, S*b* and S*c* to throw into the circuit plates Y, K and B, run the machine to obtain on R a curve *r*.

*Analysis.*—

$$\frac{r}{K}=\frac{y}{B}$$

but $y=a$ and $B=CK$; $\therefore\ r=a/C$. The curve *r* thus constitutes the answer to the problem.

EXAMPLE 15

To divide curve *a* from Figure 29 by a constant C. The difference here is that curve *a* dips in places below the *x*-axis. So, determining $M_1$ as in Example 5, we draw on plate Y the curve $y=a+M_1$. The rest of the procedure is as in Example 14. In the final analysis, $$r=\frac{K(a+M_1)}{KC}$$

from which $$\frac{a}{C}=r-\frac{M_1}{C}$$

Therefore, lay off on plate R an *x*-axis for scale S*r* at $$Sm=\frac{M_1}{C}$$

Then, curve *r* when read on scale S*r* constitutes the desired curve $a/C$.

EXAMPLE 16

To divide a constant C by the curve *a* of Figure 28.

*Procedure.*—Lay off the constant C on either plate A or plate K, and set the other plate at unity. Draw the curve *a* on plate Z. Switch in the mentioned plates, and operate the machine to form on plate R a curve *r*.

*Analysis.*—

$$r=\frac{KA}{z}$$

but $K=C$ while $A=1$ (or vice versa) and $z=a$. Consequently, $$r=\frac{C}{a}$$

*Note.*—In this operation if we set both K and A at unity, we obtain the reciprocal of a given curve.

EXAMPLE 17

Figure 30:
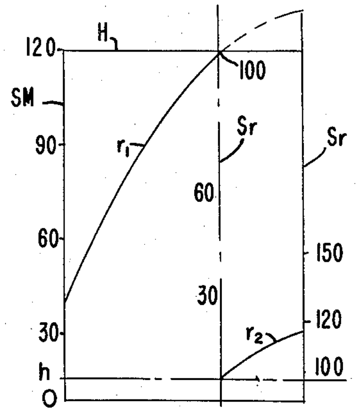

To divide curve *a* of Figure 30 by curve *b* of the same figure.

*Procedure.*—Lay off curve *a* on plate Y and curve *b* on plate Z. Switch-in K and set same at unity. Operate the machine to obtain curve *r* on plate R. Then $$r=\frac{y}{z}=\frac{a}{b}$$

EXAMPLE 18

To divide curve *b* of Figure 31 by curve *a*. Here there is danger that the quotient $b/a$ might tend to dip below the safety line *h*. When there is reason to suspect this, the procedure is broken up into two distinct operations:

*Operation 1.*—Select an optional value $h_1$ greater than *h* on the contemplated R-plate, and using the procedure of Eample 11, prepare the curve $h_1a$. More specifically, lay off curve *a* on the Y-plate. Set $K=h_1$ and $B=1$. Operate the machine to obtain a curve $r_1=ah_1$ on the R-plate; withdraw the R-plate and insert in nest U. Insert a fresh plate in nest R.

*Operation 2.*—Shift the Y-plate into nest Z. Lay off curve *b* on a fresh plate and insert it in nest Y. Set $K=1$. Plug-in plate U in series with Y. Now, complying with conditions B and C as to switches S*a*, S*b*, S*c* and R*d*, operate the machine to obtain a curve *r* on the R-plate.

*Analysis.*—

$$r=\frac{K(y+u)}{z}$$

but $K=1$, $y=b$, $u=r_1=ah_1$ and $z=a$. Therefore $$r=\frac{b}{a}+h_1$$

So, lay off an *x*-axis on plate R at the point $SM=h_1$; inscribe scale S*r* with respect to this axis; then *r*, when read on scale S*r*, represents the desired curve $b/a$.

EXAMPLE 19

If instead of *b* from Figure 31, we were required in Example 18 to use *b* from Figure 29 (which dips in places below the *x*-axis), a three-step procedure would be required.

*Operation 1.*—Same as Operation 1 in Example 18. Result is $r_1=h_1a$.

*Operation 2.*—Determine $M_2$ as in Example 5, so that the curve $y=b+M_2$ shall be entirely positive and above the minimal *h*. Following procedure of Example 16, produce the curve $$r_2=\frac{M_2}{a}$$

More specifically, set $A=M_2$, $z=a$, $K=1$ and operate the machine to produce curve $M_2/a$ on the R-plate, whereupon we transfer the latter into the V-nest.

*Operation 3.*—Lay off curve $y=b+M_2$ on plate Y; plug-in U in series with Y. Leaving curve *a* on the Z-plate and $K=1$, plug-in plate V in series with R. Run the machine, obtaining a curve on plate R.

*Analysis.*—

$$v+r=\frac{y+u}{z}$$

But $$v=r_2=\frac{M_2}{a}$$

$z=a$, $y=b+M_2$, $u=r_1=ah_1$; therefore $$\frac{M_2}{a}+r=\frac{b+M_2+ah_1}{a},\ \text{or}\ r=\frac{b}{a}+h_1$$

So, we again lay off an axis for scale S$r$ at $SM=h_1$, and the so calibrated $r$ curve is the desired result.

VII. *Simultaneous multiplication and division*

In this case, we use the Q-plate instead of K.

EXAMPLE 20

Wanted $$r=\frac{ab}{c}$$

where $a$ and $b$ are the two curves of Figure 31, while $c$ is, say, the curve $a$ of Figure 28.

*Procedure.*—Lay off curve $a$ on plate Y, curve $b$ on plate Q, and curve $c$ on plate Z. Operate the machine. Then $$r=\frac{ab}{c}$$

VIII. *The case when dividend curve has negative values*

EXAMPLE 21

Figure 33:
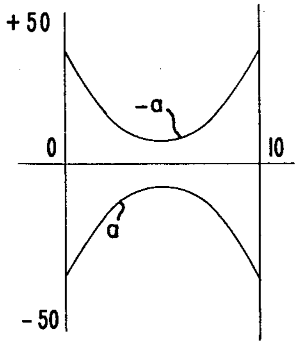

*A completely negative dividend.*—Say, we want $$\frac{k}{a}$$

where $k$ is a constant and $a$ is the curve of Figure 33, entirely below the $x$-axis.

*Procedure.*—Proceeding as in Example 3, lay off on plate Z the mirror image of curve $a$; then $z=-a$. Set plate A at value $k$; set $K=1$, and operate the machine to give us a curve, which we may designate as $$r_1=\frac{k}{-a}$$

Transfer this plate to nest U and obtain the mirror image of curve $u=r_1$ as in Example 3. I.e., plug-in U in series with a fresh R. Set plate A at H. Set $K=B$ at an optional value. Operate the machine to lay off a new curve on R, which (as demonstrated in Example 3) is $H-u$. Orient the $x$-axis at point $SM=H$, and draw scale S$r$ downwards (of same pace as SM). Then $r$, when read on this scale, represents the desired curve $$\frac{k}{a}$$

*Proof.*—

$$u=r_1=\frac{k}{-a},\ r=H-u$$

hence $$r=H+\frac{k}{a},\ \frac{k}{a}=r-H$$

EXAMPLE 22

Figure 34:
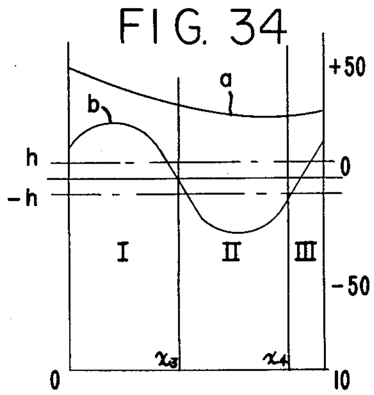

Say we want to divide curve $a$ of Figure 34 by curve $b$. The latter passes through zero at two points: $x_3$ and $x_4$. It is clear that the quotient will be infinite at these points. The expected curve $r$, therefore, is discontinuous as we follow it along the $x$-axis. It is therefore better to break up the problem into 3 sections as indicated by the vertical lines through $x_3$ and $x_4$. Treating each section separately, we have in sections I and III completely positive curves, which we can treat as in Examples 14 to 19, and in section II a completely negative curve, which we treat according to Example 21.

It will be understood that the above examples are merely illustrative, and that numerous other types of problems may be solved with the device of Figure 26 by applying the general principles illustrated in these examples. The device is thus one of essentially universal utility insofar as operations on curves are concerned. It will be noted incidentally that a person need not know the formulas of the curves thrown into operation. Nor is he compelled to measure ordinates corresponding to selected abscissas, inasmuch as the transfer from a given curve drawn on ordinary paper to the standard sheets of this invention may be effected mechanically as for instance by the aid of a pantograph.

The structure of the device itself may be varied considerably. For instance, the device may contain fewer than the 13 plates shown in Figure 26, inasmuch as most problems do not require the simultaneous use of as many plates. On the other hand, a larger number of plates may be provided if desired. Likewise, while I have shown three plug-in sockets 520 in series with plate R, and two each in series with Y, Z and Q, it is clear that a larger number of such sockets may be provided for each plate.

The series of standard plates may contain members of lower gage than G, for instance 0.3G; and the entire series may be built on a different sequence than the one selected here. In such cases, however, the rotary switch R*d* must be correspondingly re-designed.

The imprinted parallel lines 211 on the sheets 210 may be of substantial width, so that when roller 311 is at the midpoint of such a line it contacts only that one line. But in such event it is recommended that the spaces between lines should be of exactly the same width as the lines themselves, so that before the roller rolls completely off the edge of one line it contacts the edge of the next line, thus maintaining a continuous current within the coil of electromagnet 41. However, there is no absolute need for making the imprinted lines so wide. Instead, the lines may be made very fine, with correspondingly fine spacing, so that roller 311 contacts several lines simultaneously. In such event, the vertical resistivity of a given sheet is the net resistance (inverse of the summarized conductance) per unit height of the entire group of lines contacted simultaneously by the roller. Finally, the roller 311 may be replaced by sliding contactors of fixed face width $w$, as shown for instance in Figure 23. In this figure, 361 is an elastic contact member shaped out of sheet metal, and supported on the insulated, vertical, sliding post 310.

The nests on rack 10 for receiving and holding the various plates may be of any mechanical construction which will achieve the following 3 objects: (*a*) Permit of easy insertion and removal of the plates; (*b*) Hold same with a slight degree of pressure against contactors 113 (Figures 8 and 9); (*c*) Leave the front face 201 exposed for contact with rollers 311.

Figure 5:
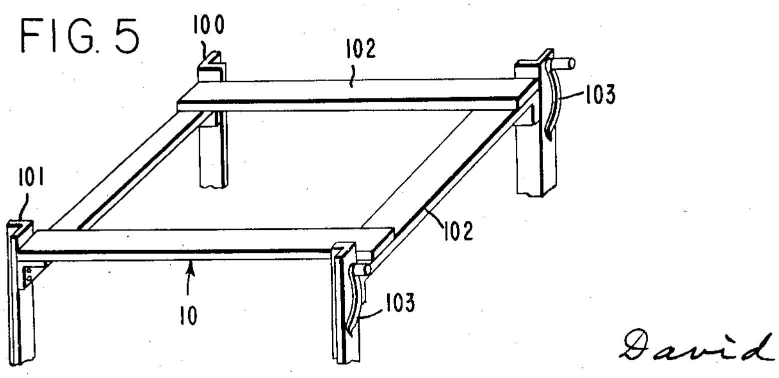
Figure 5 is a detail, in perspective of the framework of the machine of Figure 4.

In Figure 5, which is a detail of the rack employed in Figure 4, these conditions are achieved by having a flat horizontal frame 102 affixed to the four legs 100 and 101 of the rack, so as to provide a smooth railing for sliding in and supporting the plates 20. Clips 103 are attached to the front legs in such a manner that they may be swung into horizontal position and exert elastic pressure against the plate 20 when the latter is in, and swung out of the way when the plate is to be removed.

Also, leg 101 is set a little back of the front left corner of the rack, and the plates 20 (Figures 8, 9, 22 and 39) are beveled at this corner, so that contactor 311 will not become short-circuited onto metal strip 113 through the conductive area 212 to the left of vertical line X1.

Figure 38 shows schematically an alternative form of the mechanism for moving the ordinate marking assembly 450. The local terminals of the polarized relay R*e* lead to a motor having two magnetic field windings and whose direction of rotation depends on the direction of the local current. The dotted lines between relay and motor are intended to indicate customary apparatus, including a battery or other source of energy for the magnetic field of the motors, all of which is per se known in the art. The motor is geared to worm-gear 382, supported on proper bearings 383 and adapted to move, by aid of threaded blocks, the vertical column 423 to the right or to the left of Figure 38, depending on the direction of its own rotation.

In Figure 24 is shown a modified form of the ordinate marking member 450, which instead of bearing a crayon or ball-pen 456 is notched at its point 453 to carry a felt pad, a bristle brush or similar device 458 of substantial extent lengthwise of member 450. The brush or felt pad draws a conductive ink, for instance a silver or aluminum ink, from a suitable reservoir (not shown) and paints a conductive ribbon on the sheet 21 as the member 450 is carried in the direction of the $x$-axis (Figure 39). The lower edge of this ribbon defines the curve $r$ which is the resultant of the given mathematical operation, but in this case no subsequent conductivizing step is needed, inasmuch as the needed conductive area 214 is laid off simultaneously with tracing the curve. With this type of contact member 450, the distance $d$ of Figure 22 is zero, and no compensating resistance of type R$d$ (Figures 25 and 26) is needed or used. Furthermore, with this type of ordinate determinant, there is no need of feeding the current out of the ordinates and into relay R$e$ through member 450, for here the current can flow through the painted ribbon 214 (Figure 39) down the left edge of the plate and out through elastic metallic contact strip 113. Consequently, in this case, strip 113 of the uppermost plate is connected to relay R$e$, while member 450 may be shorted on to ribbon 113, or may be made of non-conductive material altogether.

Numerous other variations in detail will be apparent to those skilled in the art. But one special variation in structure will now be presented by the aid of which the graph drafting device of Figure 26 can be endowed with the additional power to draw the integral and the derivative of a given curve.

THE INTEGRATING AND DIFFERENTIATING ATTACHMENT

In Figures 4, 8, 9 etc., I have pictured roller 311 as being permanently attached to insulated post 310. But now, let us replace simple roller 311 by the modified arrangement shown in Figure 39. Insulated post 310 here is of a circular cross section. Swingably mounted thereon by the aid of collar 610 is a composite contactor comprising roller 311 and oblong contactor ribbon 611. The two are situated at right angles to each other, so that by rotating collar 610 on post 310, either roller 311 or ribbon 611 can be brought to bear against the bent over front edge of sheet 210. Ribbon 611 may be continued and bent over upon itself as at 612, so as to transmit through springs 613, pressure upon the face 611, which pressure may be supplied by roller 620, clamped on, through elastic attachment 621 to leg 101 of the supporting rack. Pin 614 fitting into one or the other of grooves 314 in post 310, and movable by the aid of thumb piece 616 against spring 617, secures the hold of collar 610 on post 310 in either of its positions.

When limb 311 of the composite contactor is swung into contact with imprinted sheet 210, contact is made with one or but several of the resistor lines 211 imprinted on the sheet, and the machine performs as in the entire discussion hitherto. But when limb 611 is swung into position, contact is made simultaneously with all the imprinted ordinates between the left edge of the plate (line X1) and the forward position $x$, of the contacting ribbon. Current can now flow through contactor 611 up all the ordinates between X1 and $x$, and through the freshly painted conductive area 214 down the bent left fold of the plate and then through elastically held contact ribbon 113 to relay R$e$. The resistance thus comprised between the two metallic contactors is the inverse of the summarized conductance of all the ordinates $y$ between X1 and $x$. Since the imprinted ordinates are fine and closely spaced, the summarized conductance may be replaced by their integral sum:

$$\Sigma c \doteq \int_{x_1}^{x} c\,dx, \text{ where } c=\frac{1}{Gy}$$

G being the vertical resistivity of the plate in ohms, and $y$ the height of the ordinates. Then the summarized resistance is $$\rho=\frac{1}{\int_{x_1}^{x}\frac{dx}{Gy}}$$

But $\rho=Gr$; therefore $$r=\frac{1}{\int_{x_1}^{x}\frac{dx}{y}}$$

If desired, the composite contactor of Figure 39 may be further modified to reduce friction between metallic strip 611 and the overhanging flap of sheet 210. This may be done for instance, by interposing a flexible conductive ribbon, as shown in Figure 12 of my copending application, Serial No. 553,334, now Patent No. 2,833,-901.

The operation of this modified structure will now be illustrated by the following additional examples. In the discussion below we shall assume that the modified structure permitting interchangeability between rollers 311 and ribbons 611 has been provided opposite plates R, Y, Z and Q. If found necessary, some or all of the other plates may be provided with the same feature.

*IX. Integration*

This will generally require a three-step procedure.

EXAMPLE 23

Figure 35:
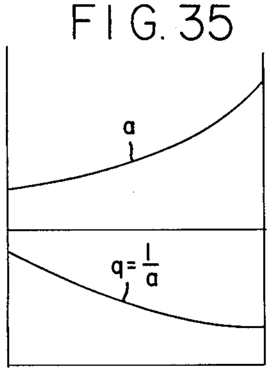

Wanted, for instance, the area under curve $a$ of Figure 35.

*Operation 1.*—Lay off the given curve on the Z-plate, calling it $z_1$. Obtain on the R-plate the reciprocal of this curve following the procedure of Example 16. Call the resulting curve $r_1$, and transfer the plate into the Q-nest. Then $$q=r_1=\frac{1}{z_1}=\frac{1}{a}$$

*Operation 2.*—Swing the ribbon contactor of the Q-plate into place, and setting A=B at an arbitrary value, run the machine to obtain a curve on the R-plate. Let us call this curve $r_2$; then from the reasoning above, $$r_2=\frac{1}{\int_{x_1}^{x}\frac{dx}{q}};\text{ but } q=\frac{1}{a};\text{ hence } r_2=\frac{1}{\int_{x_1}^{x}a\,dx}$$

where $a$ is the given curve (hence, not to be confused with a constant). We thus have obtained the reciprocal of the desired area.

*Operation 3.*—Transfer the R-plate into the Z-nest, thus converting $r_2$ into $z_2$; and again following the procedure of Example 16, obtain the reciprocal of $z_2$. The curve thus obtained on R, which we may call $r_3$, is the sought area under given curve $a$.

*X. Differentiation*

In this operation it is essential that we use an ordinate marker of the type shown in Figure 24, that is, one which simultaneously conductivizes the area above the curve it sketches. (Of course, if operations involving differentiation are contemplated, it will be expeditious to provide the machine permanently with ordinate marker of the said type 24$a$, and use it even in the other operations.) Except that we interchange the roles of some of the plates, the procedure runs on the same principles as integration.

EXAMPLE 24

Wanted the derivative of curve $a$ in Figure 35.

*Operation 1.*—Laying off curve $a$ on the Z-plate, proceed to obtain its reciprocal as in Example 22, Operation 1. Calling this curve $r_1$, transfer the R-plate into the Y-nest. Then $$y=r_1=\frac{1}{a}$$

*Operation 2.*—Swing the ribbon contactor onto the R-plate. Set $B=K$ at an arbitrary value. Run the machine to obtain a curve on plate R. Calling this curve $r_2$, the resistance in the R-leg of the bridge for each position $x$ of the forward end of the ribbon contactor is now $$\rho=\frac{1}{\int_{x_1}^{x}\frac{1}{Gr_2}dx}$$

where G is the resistivity of the R-plate. Hence, $$\rho=\frac{G}{\int_{x_1}^{x}\frac{dx}{r_2}}$$

From the fundamental Wheatstone bridge relation, $$\frac{\rho}{GK}=\frac{Gy}{GB}$$

but $K=B$; hence, $$\frac{1}{\int_{x_1}^{x}\frac{dx}{r_2}}=y;\ \int_{x_1}^{x}\frac{dx}{r_2}=\frac{1}{y}=a$$

Therefore, $$\frac{da}{dx}=\frac{1}{z}$$

We have thus arrived at the reciprocal of the sought derivative.

*Operation 3.*—Transfer the R-plate into the Z-nest, and returning all contactors to normal (i.e. roller 311), operate the machine as in Example 16, to obtain on the R-plate the reciprocal of curve $z=r_2$. Calling the resulting curve $r_3$, it is obvious that $$r_3=\frac{da}{dx}$$

*XI.*

EXAMPLE 25

*Integration.*—Suppose the given curve $a$ has negative values (cf. Figure 29). Then we must first rectify the given curve by adding to it $M_1$ as in Example 5. The problem then proceeds as in Example 23, but actually we are integrating not curve $a$, but curve $a+M_1$. Consequently, in the end, $$r_3=\frac{1}{r_2}=\int_{x_1}^{x}(a+M_1)dx$$

wherein $a$ is a variable while $M_1$ is constant. Therefore, $$r_3=\int_{x_1}^{x}adx+M_1(x-x_1)$$

So we add to the procedure a 4th step:

*Operation 4.*—Transfer the last R-plate to the Y-nest. Plug-in plate L in series with Y, setting $h$ at an arbitrary value $M_2$ so that $(M_2+M_1x_1)$ is greater than $h$. (If $x_1$ is not zero, $M_2$ may not be needed). Draw on the U-plate the straight line $u=M_2+M_1(x-x_1)$ and insert same in series with R. Set $B=K$ at a convenient arbitrary value. Using the normal contactor throughout (roller 311), run the machine to obtain a curve on the R-plate.

*Analysis.*—At balance, $r_4+u=y+L$; hence $$r_4+[M_2+M_1(x-x_1)]=y+M_2$$

But $$y=r_3=\int_{x_1}^{x}adx+M_1(x-x_1)$$

therefore $$r_4=\int_{x_1}^{x}adx$$

EXAMPLE 25

Taking the problem of Example 23, suppose $q=1/a$ tends to become so small as to drop below the $h$-line (minimum safety line). We may tackle this problem in several ways:

(I) If $a$ is high enough above the $h$-line, we may replace it by $a-M_1$, wherein $M_1$ is so chosen as to make $$q=\frac{1}{a-M_1}$$

fit properly within the plate, being totally above the $h$-line and totally below the H-line. The rest of the operation is then as in Example 23. But then we have actually integrated curve $(a-M_1)$ instead of curve $a$. So we add a fourth step as in Example 25, except that here we plug in the straight-line plate $u=M_2+M_1(x-x_1)$ in series with Y, while the plate $L=M_2$ we insert in series with R.

*Analysis.*—At balance, $$r_3+M_2=\int_{x_1}^{x}(a-M_1)dx+[M_2+M_1(x-x_1)]$$

hence, $$r_3=\int_{x_1}^{x}adx$$

(II) We may leave $a$ undisturbed, but simply select a sheet of lower gage for the curve $q=1/a$. Then each ordinate of $q$ is taller, and we may find that the minimum $q$ is above the $h$-line. The rest of the procedure is as in Example 23.

(III) We may multiply $q$ by a factor $J>1$, selected so as to make the minimum ordinate rise above $h$ while the highest ordinate is still below H. If the rest of the procedure is as in Example 23, the result of Operation 2 is actually $$r_2=\frac{J}{\int_{x_1}^{x}adx}$$

whence $$\int_{x_1}^{x}adx=\frac{J}{r_2}$$

Therefore, in Operation 3 we set plate K at value J and plate A at unity; or we set A at an arbitrary value, and then set $K=JA$. Then $$r_3=\frac{J}{r_2}=\int_{x_1}^{x}adx$$

*Note.*—The $r_2$ curve will never become negative. But if there is danger of its dropping in places below the $h$-line, multiply $q$ by a factor J, so selected as to make the minimum $r_2$ greater than $h$. The rest of the procedure is then as in paragraph III above.

*XII.*

EXAMPLE 27

*Differentiation.*—Suppose curve $a$ has negative portions, as in Figure 29.

*Procedure.*—Rectify curve $a$ by adding to it $M_1$ as in Example 5. Then proceed as in Example 24.

*Analysis.*—In the net result we have differentiated curve $(a+M_1)$ instead of curve $a$, wherein $a$ is a variable, while $M_1$ is a constant. But as is well known, the result is the same.

$$\frac{d(a+M_1)}{dx}=\frac{da}{dx}$$

EXAMPLE 28

Suppose $y=1/a$ tends to drop below the safety line $h$. Then we have several options analogous to those in Example 26.

(I) Replace $a$ by $(a-M)$ as in Example 26–I. Finish the operation as in Example 24. Nothing further need be done, because $$\frac{d(a-M)}{dx}=\frac{da}{dx}$$

(II) Identical remedy as in Example 26–II.

(III) Multiply $y$ by a factor $J>1$. Carry out Operation 2 as in Example 24. Then $$\frac{1}{\int_{x_1}^{x}\frac{1}{r_2}dx}=\frac{J}{a}$$

from which $$\frac{da}{dx}=\frac{J}{r_2}$$

Therefore, in Operation 3, following the procedure of Example 16, obtain $$\frac{J}{r_2}$$

instead of $$\frac{1}{r_2}$$

EXAMPLE 29

Figure 36:
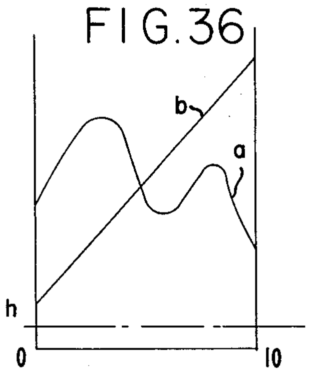
Figure 37:
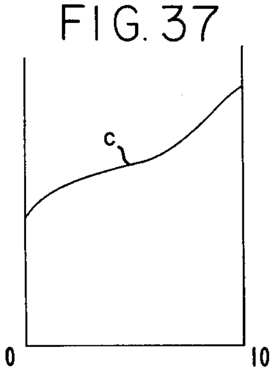

Wanted, say, the derivative of curve $a$ in Figure 36. Since the curve has sections sloping downwards, the derivative is bound to have negative sections. So we proceed as follows:

*Operation 1.*—Draw on the U-plate the straight line $b=M_1x+M_2$, where $M_1$ and $M_2$ are so chosen that $(M_1x_1+M_2)>h$, and the positive slope of the straight line is great enough to overcome the negative of slope of $a$ at any point. Putting U in series with Y, and following otherwise the procedure of Example 1, secure on plate R the sum of the two curves. If a sheet of higher gage is chosen for R, the resultant will not run off the plate and will have roughly a shape as curve $c$ in Figure 37.

*Operations 2, 3 and 4.*—Using curve $c$, execute the Operations 1, 2 and 3 of Example 24. The result of Operation 3 here is $$\int_{x_1}^{x}\frac{dx}{r_2}=c=a+b$$

hence $$\frac{1}{r_2}=\frac{da}{dx}+\frac{db}{dx}$$

But $$\frac{db}{dx}=M_1$$

therefore $$\frac{da}{dx}=\frac{1}{r_2}-M_1$$

Therefore, in Operation 4, obtain $$r_4=\frac{1}{r_2}$$

(as in Example 24), but at the end mark off on plate R an $x$-axis at $SM=M_1$. Inscribe a vertical scale for $r_4$ of same pace as SM. Then, the curve $r_4$ when read with respect to this scale constitutes $$\frac{da}{dx}$$

As will be readily apparent, other special difficulties which will arise in practice can be treated according to the above principles and successfully resolved.

It will be understood that the words "printed" or "imprinted" as used throughout this specification and claims are meant in their broadest sense as they are customarily used in the art of printed circuits. An indication of this customary usage is given in the following passage quoted from Modern Plastics of August 1951 at page 99: "Printing is defined as 'the act of reproducing a design upon a surface by any process'." The cited article then details four processes used in practice for achieving said reproduction, including spraying of metal into depressions in a plastic plate, bonding stamped metal patterns or a rigid wiring design onto a plastic base, and etching of metal foil-clad patterns. It will be readily apparent that these and other similar processes are applicable as well to produce the special plates and sheets of this invention.

I claim:

1. In combination, a plurality of resistors, a source of voltage and a movement control-mechanism joined together in a system of circuits corresponding to a Wheatstone bridge, said movement control-mechanism taking the place of the galvanometer in the ordinary Wheatstone bridge, at least one of the legs of said bridge comprising a variable resistor whose effective resistance value varies with the poistion of a movable contactor, and one of the legs of said bridge comprising a printed resistor having a non-conductive plate with semiconductive parallel lines imprinted thereon in position to represent the ordinates of a graph, and means controlled by said movement control-mechanism to mark off points on said ordinates in response to the movement of said movable contactor, whereby to outline by said points a graph on said imprinted plate, said graph bearing a predetermined mathematical relation to the variation of the effective resistance value of said variable resistor with the position of said movable contactor.

2. A device of the character described, comprising in combination a rack, a plurality of interchangeable plates supported in parallel relation in said rack and having each an electrically non-conductive surface bearing an imprinted conductive pattern, ambient means carrying electrically separated conductive contact members for individually contacting said imprinted patterns, means for moving said ambient means along one dimension of said plates while keeping each of said conductive members in contact with its respective imprinted pattern, second ambient means carrying conductive elements for making contact with the imprinted pattern on one of said plates at points other than those contacted by said first means, means for moving said second ambient means along one dimension of said one plate in unison with the motion of the first mentioned ambient means, means for simultaneously moving said second ambient means along a dimension at right angles to said one dimension, a source of electrical energy and an indicator, said imprinted conductive patterns, source of energy and indicator being electrically connected together through means including the conductive contact members of said two ambient means, whereby to form a Wheatstone bridge whose legs comprise as at least part of their resistances said conductive patterns on said plates.

3. A device as in claim 2, said second ambient means bearing elements adapted to deposit on the imprinted pattern of said one plate a visible record of the motion of said second means.

4. A device as in claim 2, said second ambient means bearing elements adapted to deposit on the imprinted pattern of said one plate an electrically conductive record of the motion of said second means.

5. A device as in claim 2, said imprinted conductive patterns being made up of a plurality of closely spaced, non-crossing conductive lines disposed at right angles to the path of motion of the first-mentioned ambient means, whereby the path of motion of each of said electrically separated contact means defines an abscissa for measuring off resistance along each of said non-crossing conductive lines.

6. A device as in claim 2, said imprinted conductive patterns being made up of a plurality of closely spaced, non-crossing conductive lines disposed at right angles to the path of motion of the first mentioned ambient means, whereby the path of motion of each of said electrically separated contact means defines an abscissa for measuring off resistance along each of said non-crossing conductive lines, the imprinted patterns on all the plates but one bearing further a conductive area of curved lower outline traversing the imprinted lines at mathematically predetermined distances from said abscissa, while the pattern on said one plate has no such curve and constitutes the pattern with which said second ambient means makes electrical contact.

7. A device as in claim 2, said means for moving said second ambient means along said right-angles dimension including an element responsive to the presence or absence of current through said indicator.

8. A device as in claim 7, said indicator being a relay, and the local terminals of said relay being included in a circuit comprising a source of energy and said means for moving said second ambient means along said right-angles dimension.

9. A device of the character described comprising in combination a source of electrical energy, four resistance groups and an indicator connected together in the form of a Wheatstone bridge, at least some of said resistance groups including variable resistors supported on stationary bodies and characterized each by having conductive lines along one dimension of its body whose resistance values vary in a predetermined mathematical relation with respect to an assumed base line along the other dimension of said body, and one of said resistance groups comprising one resistor supported on a stationary body and having conductive lines along one dimension thereof running transversely of an assumed base line but having no defined mathematical dependence on said base line, means for moving electrically conductive contactors in individual but simultaneous contact with each of said stationary resistors along their respective base lines, and further means for moving a contact member over the surface of said one resistor in contact with said conductive lines thereon, said last mentioned means moving simultaneously in a dimension parallel to its base line and in a dimension lengthwise of said independent conductive lines, said parallel motion being synchronized with the motion of said other contactors along their respective base lines and said lengthwise motion being mathematically dependent on the resultant of a predetermined mathematical operation upon the several variable resistances put simultaneously into the circuit by the motions of said baseline contactors.

10. A device as in claim 9, the last mentioned mathematical operation comprising at least one of the four basic arithmetical operations, to wit, addition, subtraction, multiplication and division.

11. A device for performing arithmetical operations upon variable functions represented by graphs, comprising in combination a plurality of resistors assembled together and joined with a source of voltage and with a current-operated control mechanism in a Wheatstone bridge formation, said current operated control mechanism taking the position corresponding to the galvanometer in the classical Wheatstone bridge, at least one of the legs of said Wheatstone bridge comprising a printed resistor in which parallel lines are imprinted in conducting ink on a non-conducting background to represent ordinates of a graph, said lines terminating on one end thereof in a conducting area traversing all said lines and outlining by its inner free edge the graph of a mathematical function which is intended to participate in said arithmetical operations, and said resistor being provided with a sliding contactor which moves in a defined path across the opposite ends of said ordinates, whereby the resistance value of each conductive ordinate is determined by the length thereof comprised between said sliding contactor and said inner edge of said conducting area, and one other leg of said Wheatstone bridge comprising a printed resistor in which parallel lines are imprinted in conducting ink on a non-conducting background to represent ordinates upon which a graph resulting from said arithmetical operations may be drawn, said resistor being provided with a sliding contactor which is adapted to move in a defined path across said imprinted lines to define one end thereof, and means associated with said Wheatstone bridge assembly and responsive to control by said current operated control mechanism whereby to move a conductive contactor transversely of said imprinted lines in said second mentioned resistor in harmony with the movement of said sliding contactor in the same direction, and to move said conductive contactor further in a direction parallel to said imprinted lines whereby to determine by its position the conductive distance along said imprinted lines between said two contactors and whereby to make said conductive distance porportional to the result of said arithmetical operations in each position of said first mentioned contactor transversely of said first mentioned imprinted lines.

References Cited in the file of this patent

UNITED STATES PATENTS

| | | |
|---|---|---|
| 2,537,498 | Wickesser | Jan. 9, 1951 |
| 2,689,082 | Kolisch | Sept. 14, 1954 |

OTHER REFERENCES

Product Engineering (Wall), September 1953, pages 136 and 137.

The Review of Scientific Instruments (French et al.), vol. 25, No. 8, August 1954, pages 765–768.

UNITED STATES PATENT OFFICE

CERTIFICATE OF CORRECTION

Patent No. 2,973,140 February 28, 1961

David Katz

It is hereby certified that error appears in the above numbered patent requiring correction and that the said Letters Patent should read as corrected below.

Column 3, line 74, for "a double-pole-throw" read -- a double-pole-double-throw --; column 8, line 25, for "resins" read -- resin --; column 10, line 18, for "plane 200" read -- plate 200 --; line 73, strike out "will", second occurrence; column 20, line 20, for "Eample" read -- Example --; column 26, line 9, for "EXAMPLE 25" read -- EXAMPLE 26 --.

Signed and sealed this 3rd day of October 1961.

(SEAL)
Attest:

ERNEST W. SWIDER
Attesting Officer

DAVID L. LADD
Commissioner of Patents

USCOMM-DC